(12) United States Patent
Winkler

(10) Patent No.: US 8,616,822 B2
(45) Date of Patent: Dec. 31, 2013

(54) RETAIL SUPPLY SYSTEM

(76) Inventor: Walter Winkler, Parkstein (DE)

( * ) Notice: Subject to any disclaimer, the term of this patent is extended or adjusted under 35 U.S.C. 154(b) by 754 days.

(21) Appl. No.: 11/567,965

(22) Filed: Dec. 7, 2006

(65) Prior Publication Data

US 2007/0125727 A1    Jun. 7, 2007

Related U.S. Application Data

(60) Provisional application No. 60/748,299, filed on Dec. 7, 2005.

(30) Foreign Application Priority Data

Dec. 7, 2005   (DE) .................. 10 2005 058 478

(51) Int. Cl.
*B65G 65/00*   (2006.01)

(52) U.S. Cl.
USPC .......................................... 414/276; 211/151

(58) Field of Classification Search
USPC .................. 186/49, 50, 57; 198/346.2, 347.1;
211/1.51, 1.52–1.57, 40, 59.2, 59.3,
211/90.01, 121, 122, 126.15, 151, 153;
221/84, 85, 119, 127; 414/268, 276,
414/285
See application file for complete search history.

(56) References Cited

U.S. PATENT DOCUMENTS

| | | | | |
|---|---|---|---|---|
| 1,092,988 A | * | 4/1914 | Gilbert | 221/110 |
| 1,876,510 A | * | 9/1932 | Morrison | 312/97 |
| 2,923,392 A | * | 2/1960 | Gabrielsen | 194/350 |
| 3,259,992 A | | 7/1966 | Bonwit | |
| 3,263,857 A | * | 8/1966 | Krakauer et al. | 221/85 |
| 3,447,699 A | * | 6/1969 | Weir | 414/285 |
| 3,450,276 A | * | 6/1969 | Ferrari | 414/276 |
| 3,528,566 A | * | 9/1970 | Weir | 414/285 |
| 3,674,159 A | * | 7/1972 | Lemelson | 414/276 |
| 3,759,417 A | * | 9/1973 | Armstrong et al. | 221/85 |
| 3,768,675 A | | 10/1973 | Argyres | |
| 3,805,974 A | * | 4/1974 | Andersson et al. | 414/276 |
| 3,895,722 A | | 7/1975 | Pluntz | |
| 4,023,687 A | * | 5/1977 | Salloum | 414/276 |
| 4,128,177 A | * | 12/1978 | Bustos | 211/59.2 |
| 4,192,436 A | * | 3/1980 | Schuller et al. | 221/129 |
| 4,238,022 A | * | 12/1980 | Williams | 193/32 |
| 4,239,099 A | * | 12/1980 | Williams et al. | 193/32 |
| 4,252,250 A | * | 2/1981 | Toth | 221/13 |
| 4,293,062 A | * | 10/1981 | Bustos | 193/2 D |
| 4,385,859 A | * | 5/1983 | Goossens | 414/267 |
| 5,096,090 A | * | 3/1992 | Schwartz et al. | 221/125 |

(Continued)

FOREIGN PATENT DOCUMENTS

| | | |
|---|---|---|
| DE | 1246575 | 8/1967 |
| DE | 7121849 | 2/1972 |

(Continued)

*Primary Examiner* — Joshua Rodden
(74) *Attorney, Agent, or Firm* — Price Heneveld LLP

(57) ABSTRACT

An automatic system for replenishing display shelves in retail business. The display shelves each including a shelf board having a conveyor belt circulating around the respective shelf board. Each of the display shelves further including a stop bar and a removable fall-off guard at respective front and rear sides of the display shelves to prevent goods from falling off of the display shelves, and wherein the display shelf is designed to cooperate with a shelf-stocking vehicle such that the fall-off guard is automatically opened when the display shelves are refilled by the shelf-stocking vehicle.

19 Claims, 17 Drawing Sheets

(56) References Cited

U.S. PATENT DOCUMENTS

| | | | |
|---|---|---|---|
| 5,096,366 A * | 3/1992 | Bernard et al. | 414/800 |
| 5,160,051 A * | 11/1992 | Bustos | 211/59.2 |
| 5,222,855 A * | 6/1993 | Bernard et al. | 414/331.03 |
| 5,380,139 A | 1/1995 | Pohjonen | |
| 5,385,243 A * | 1/1995 | Jackson et al. | 209/509 |
| 5,472,309 A * | 12/1995 | Bernard et al. | 414/807 |
| 5,933,814 A | 8/1999 | Rosenberg | |
| 6,042,321 A * | 3/2000 | Labell | 414/276 |
| 6,505,755 B1 * | 1/2003 | Voss | 221/192 |
| 6,692,211 B2 * | 2/2004 | Yuyama et al. | 414/278 |
| 6,729,836 B2 * | 5/2004 | Stingel et al. | 414/791.6 |
| 6,808,082 B2 * | 10/2004 | Ohkubo | 221/123 |
| 6,923,612 B2 * | 8/2005 | Hansl | 414/277 |
| 2003/0006174 A1 | 1/2003 | Harres et al. | |
| 2004/0165974 A1 * | 8/2004 | Gironi et al. | 414/281 |
| 2007/0144991 A1 * | 6/2007 | Hansl et al. | 211/121 |

FOREIGN PATENT DOCUMENTS

| | | |
|---|---|---|
| DE | 9403105 | 7/1974 |
| DE | 2510028 | 9/1976 |
| DE | 2843578 | 4/1980 |
| DE | 3736419 | 5/1989 |
| DE | 19857282 | 6/2000 |
| DE | 10039394 | 9/2001 |
| DE | 20206257 | 7/2002 |
| DE | 10102999 | 8/2002 |
| DE | 10225332 | 1/2004 |
| DE | 102004019905 | 11/2005 |
| DE | 60300107 | 12/2005 |
| EP | 8706291 | 7/1987 |
| EP | 0359661 | 3/1990 |
| EP | 0481969 | 4/1992 |
| EP | 0603140 | 6/1994 |
| EP | 0771451 | 5/1997 |
| EP | 1422169 | 5/2004 |
| FR | 2125460 | 9/1972 |
| JP | 11130240 | 5/1999 |
| WO | 9920530 | 4/1999 |
| WO | 9940822 | 8/1999 |

* cited by examiner

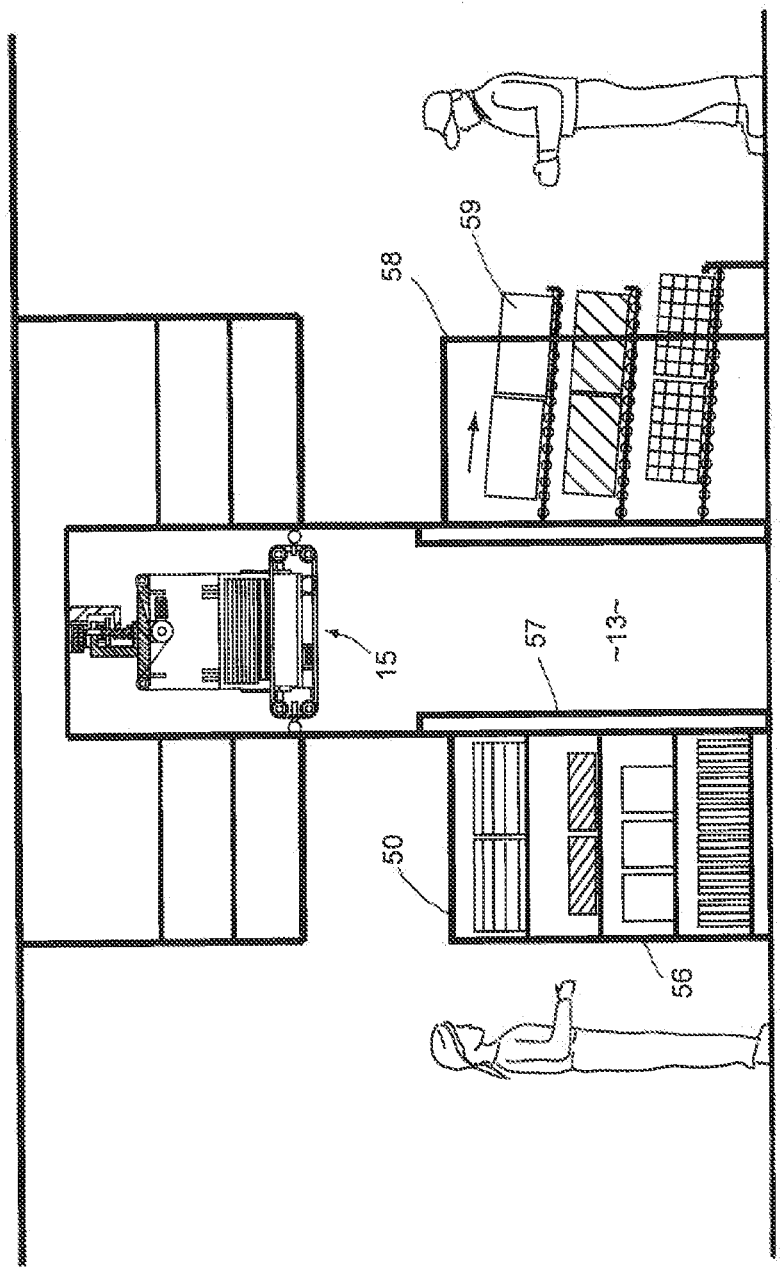

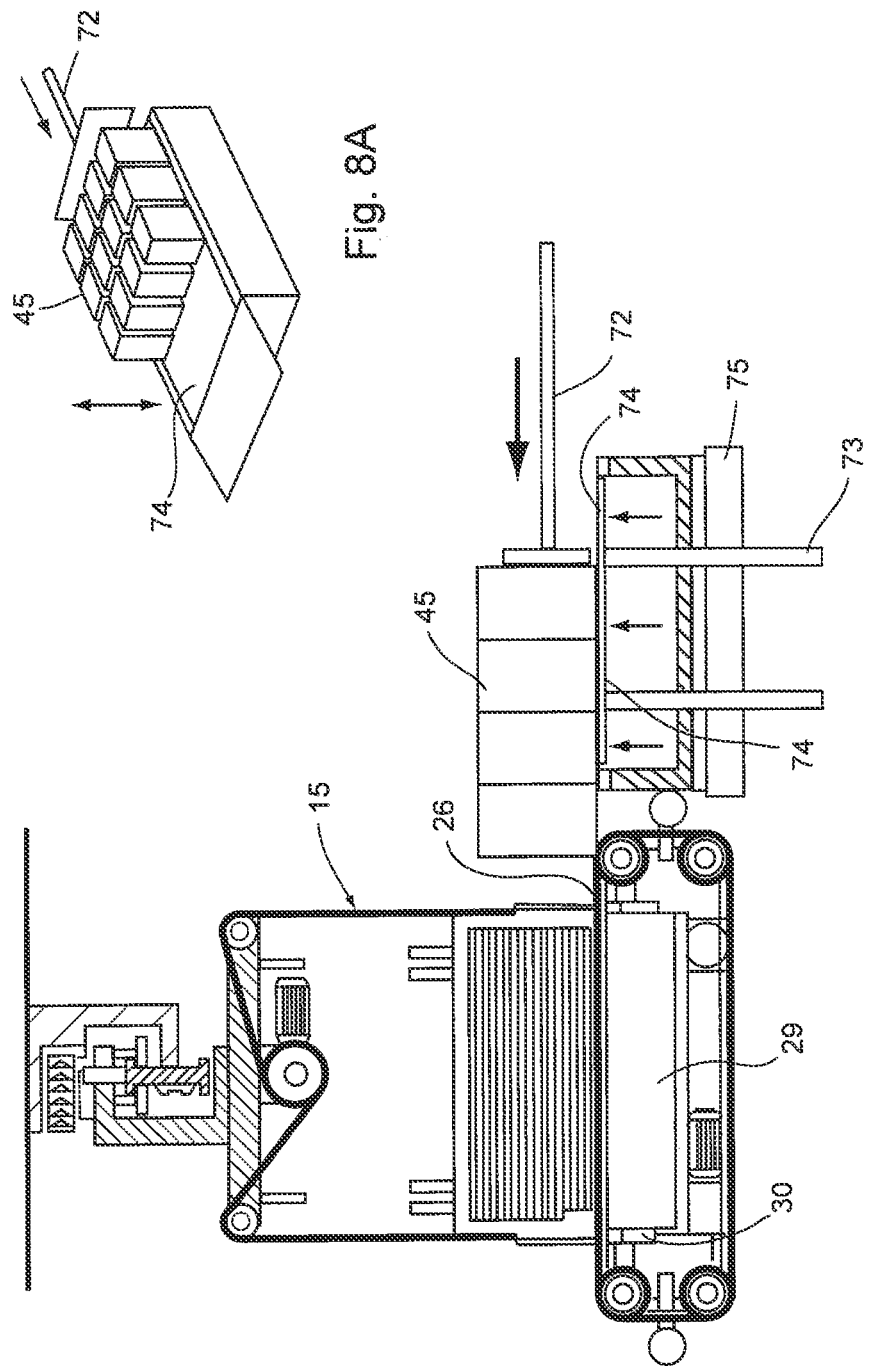

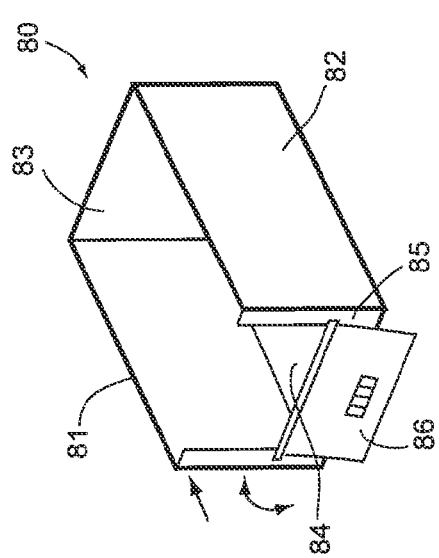
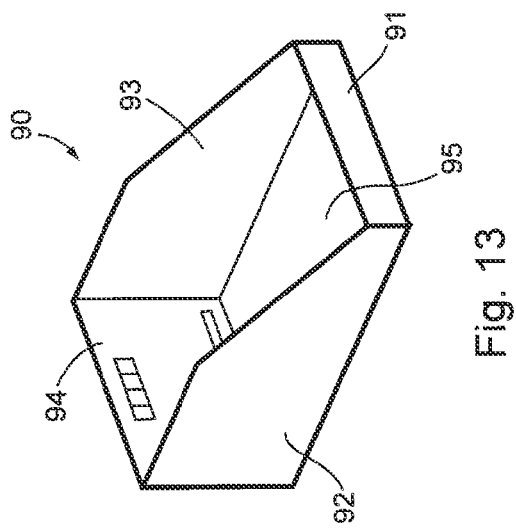
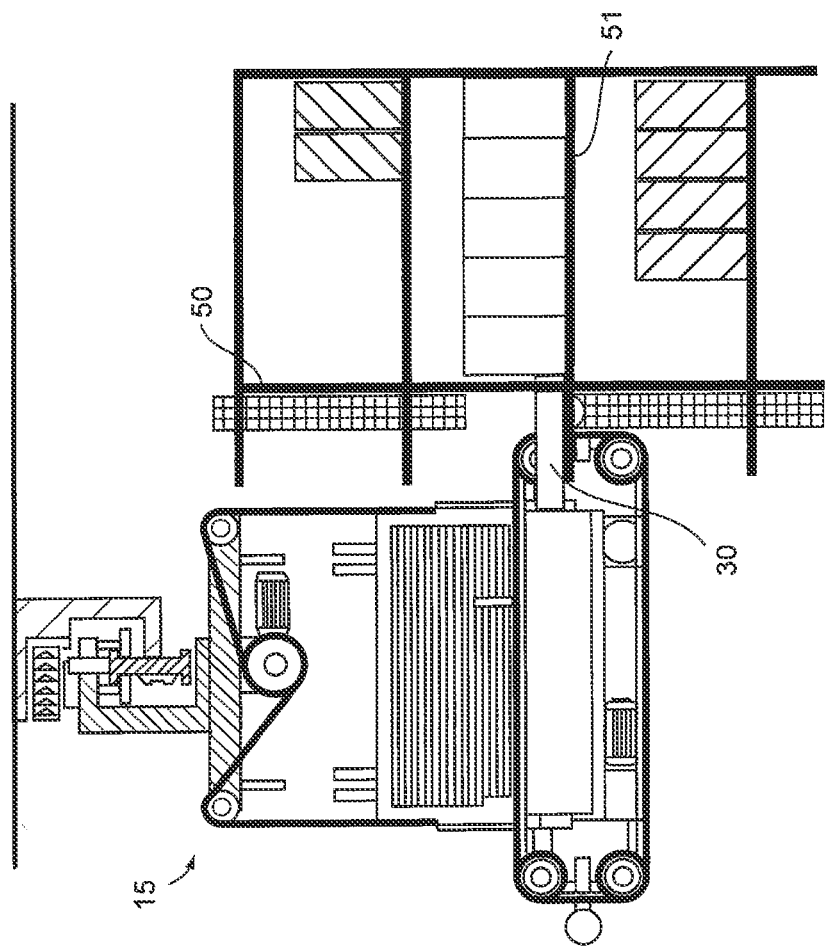

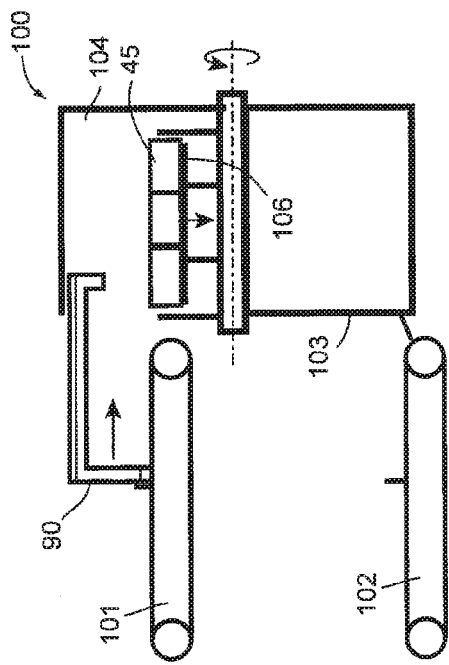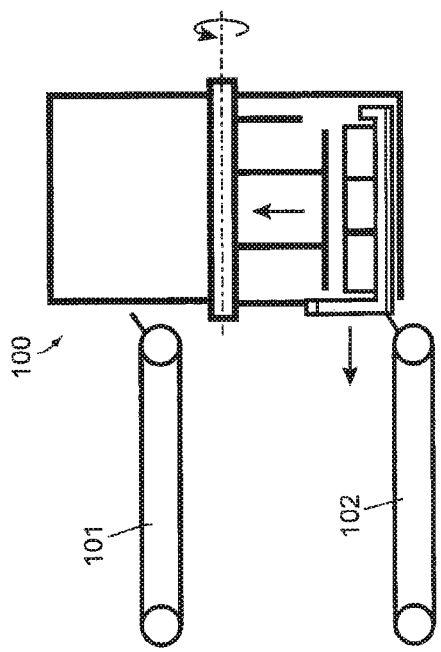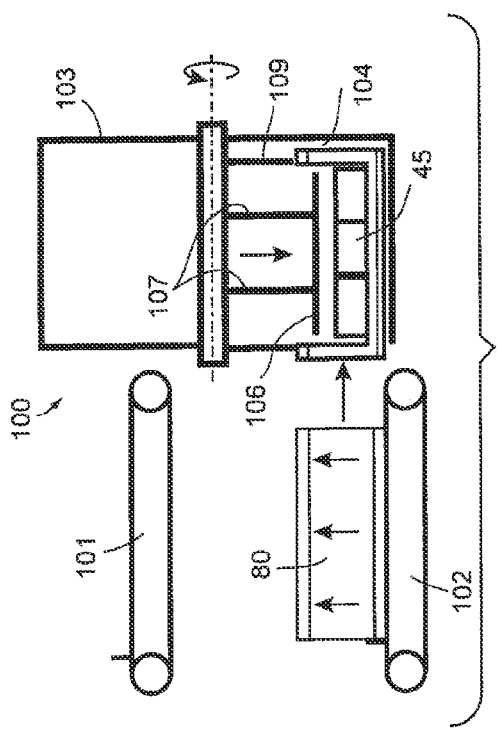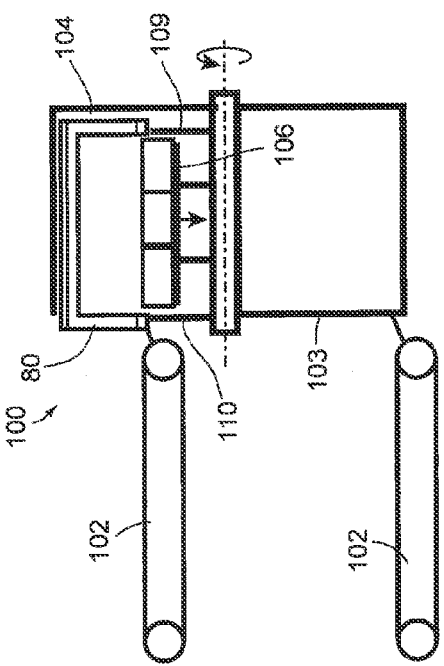

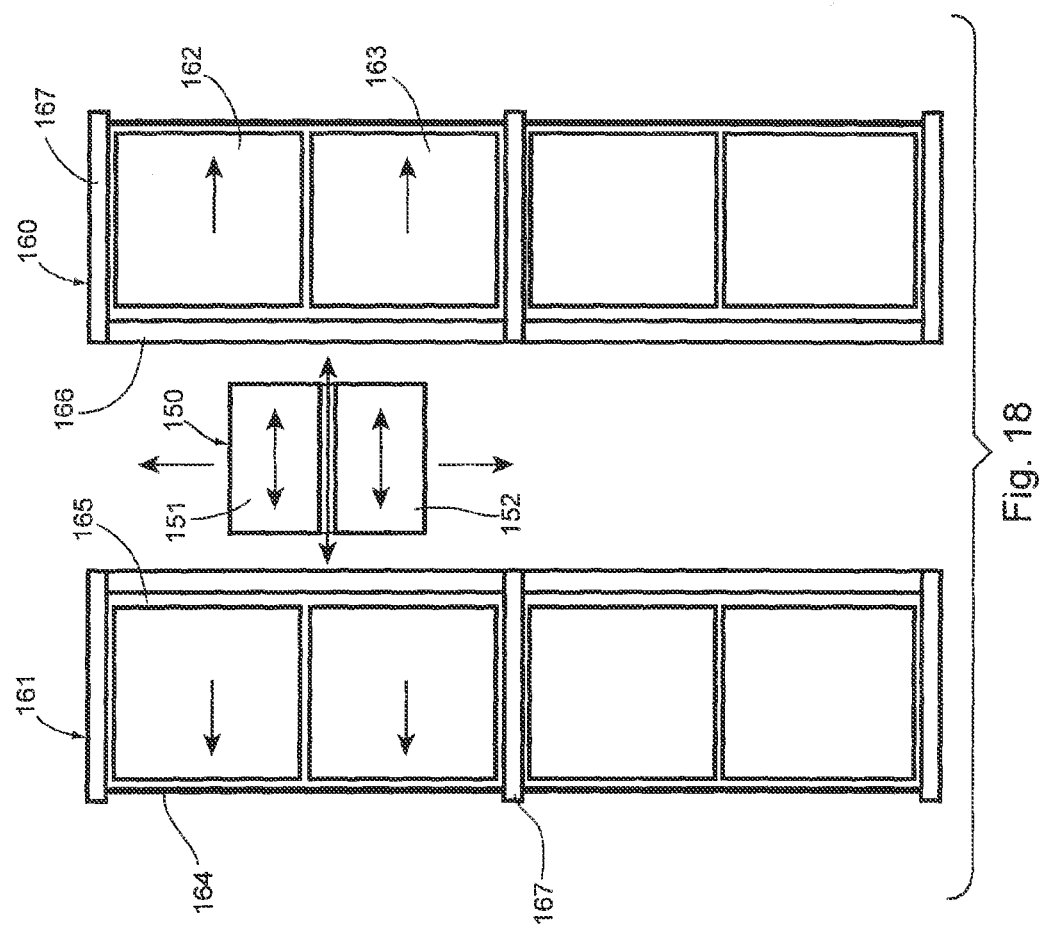

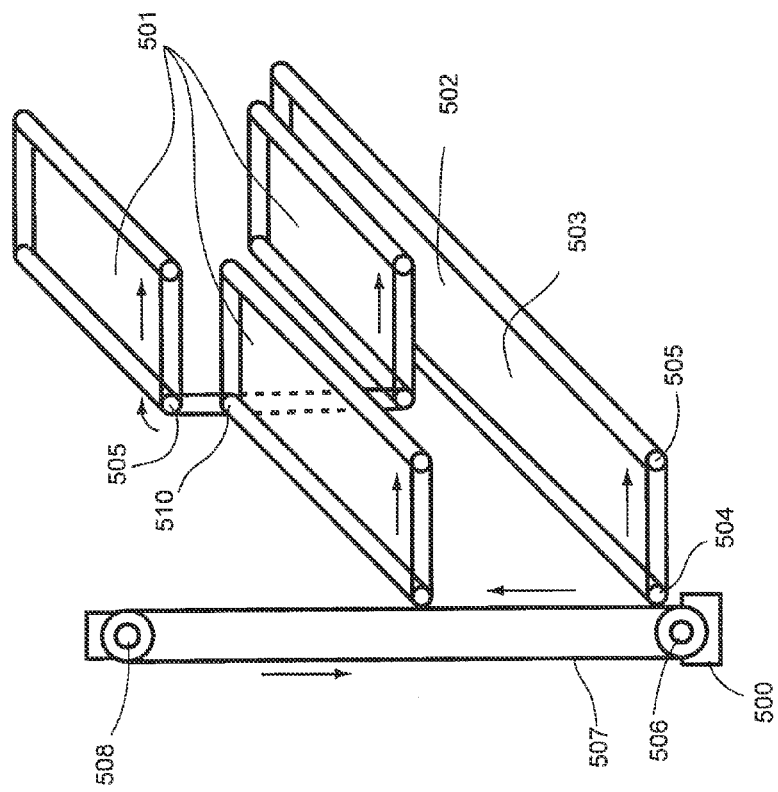

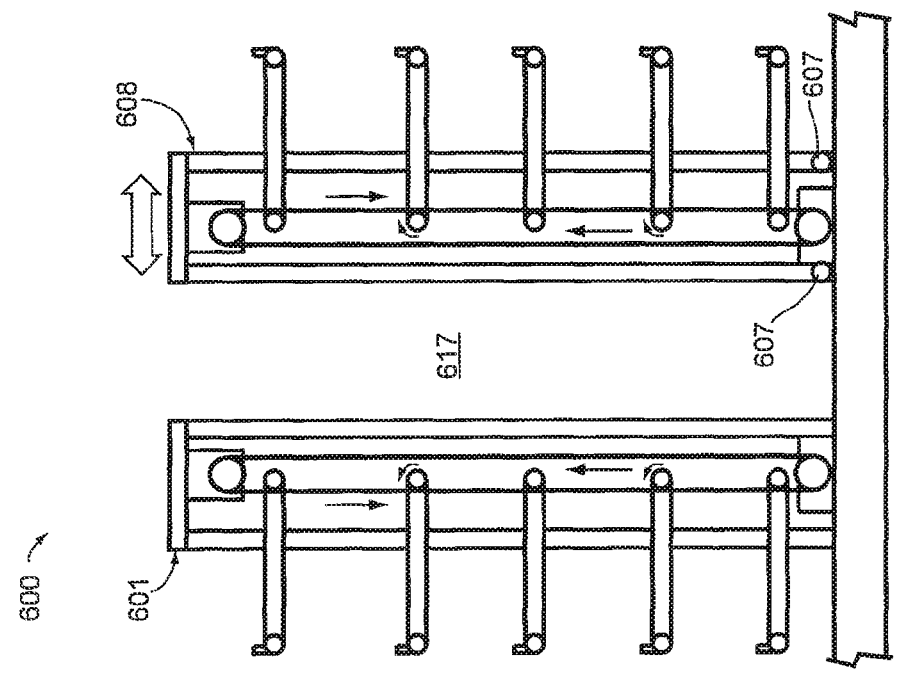
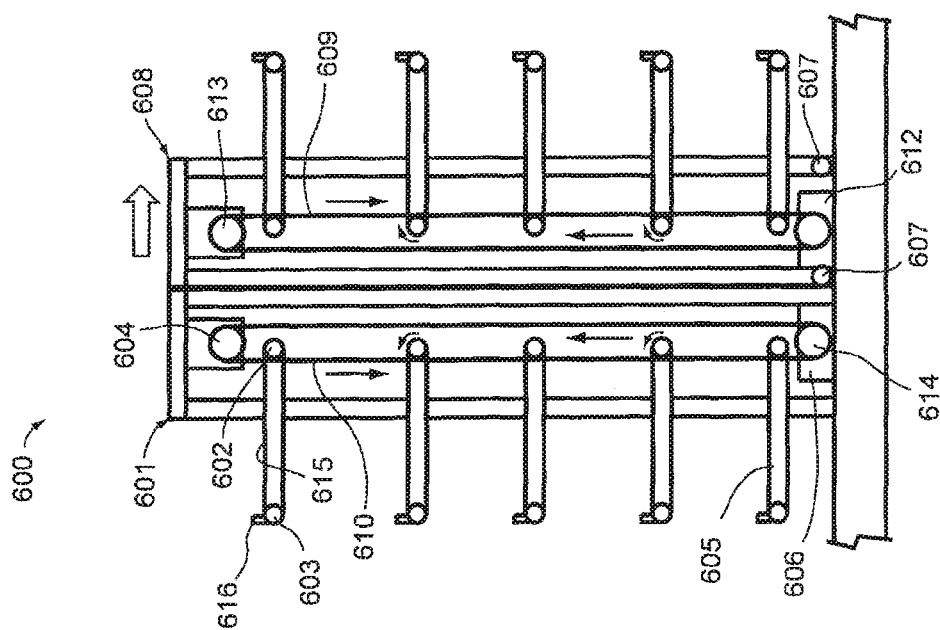

RETAIL SUPPLY SYSTEM

CROSS-REFERENCE TO RELATED APPLICATION

This application claims priority to U.S. Provisional Patent Application No. 60/748,299 filed on Dec. 7, 2005. This application also claims priority to Application Serial No. 10 2005 058 478.07 filed in Germany on Dec. 7, 2005.

FIELD OF THE INVENTION

The present invention refers to a display shelf, a shelf-stocking vehicle, a device for transporting goods for sale into a display shelf as well as a repacking and transfer station, being used in such a transfer system device and a method for operating such devices.

BACKGROUND OF THE INVENTION

In the retail trade, a plurality of goods supplied by suppliers or central distribution centers need to be sorted into display shelves in the retail business where they are then ready for sale to the customers. This is usually done purely manually by corresponding personnel in the retail business.

Aside from the refilling of the display shelves with new goods, it is primarily also necessary in the retail businesses to push goods to the front of the display from time to time, after individual goods have been sold, in order that a tidy and positive overall impression may be presented to the purchasers. Especially in the case of retail businesses offering high-quality goods and/or services, it is particularly important to create an ambience for sophisticated customers that encourages sales. An indispensable part of this is the pushing or tracking of goods stored in the shelves to the very front of the display in order that the impression may be conveyed to the customer that he can choose from a new, fresh and complete range, without having to make do with selected or leftover goods. For this reason, more than one-third of the sales personnel in some retail businesses, such as supermarkets and the like, spend their time filling or closing gaps in display shelves that have arisen from sold goods.

Additionally, the sales personnel must also refill the shelves with the repeat deliveries of goods.

To this end, the goods, mostly delivered by truck, first have to be unpacked from the packaging, such as boxes, and transported to the corresponding shelves where they are sorted into the corresponding display compartments. This involves considerable effort.

Effort is especially involved in ensuring that those goods which, for example, have an earlier expiration date, are always at the front. Since replenishment goods are generally also sorted into the shelf from the front and these goods with their later expiration date first have to be sorted into the back of the shelf, all the goods already in the shelf first have to be removed, the replenishment goods have to be placed at the rear of the shelf and then, in turn, the goods with the earlier expiration date have to be arranged at the front.

Both pure tracking of the goods to the front of the shelf and re-sorting according to expiration dates lead to substantial effort that so far has had to be performed manually by personnel.

SUMMARY OF THE INVENTION

It is therefore an object of the present invention to eliminate the aforementioned disadvantages of the hitherto method of tracking goods to the front of display shelves and/or for providing replenishment supplies to retail business and to provide overall a logistics concept or replenishment system with correspondingly appropriate components, which facilitate simple supply of goods for sale to retail companies combined with an appealing presentation of the goods for the least possible effort.

An aspect of the present invention includes an automated tracking and replenishment system or logistics concept for retail businesses which is technically feasible despite the many different objects for sale in such a retail business, such as a supermarket.

Another aspect is the knowledge that tracking goods for sale to the front or display side of a display shelf is simply possible with a display shelf having conveyor belts on which the goods for sale are stored, with the conveyor belts being wound around the shelf boards as continuous belts and, through a movement of the conveyor belt whereby the belt section arranged on the top of the shelf board is moved towards the front side or display side of the display shelf, the goods arranged thereon are tracked in a simple manner.

To prevent the goods on the conveyor belt from falling off the shelf on reaching the front of the display shelf, a stop bar can be provided at the front of the display shelf, the bar provided just above the shelf board in the form of a narrow strip, in order to provide a stop in the lower section of the sales goods. The stop bar is arranged at a distance from the shelf board such that a gap is formed between shelf board and stop bar, through which gap the conveyor belt is guided. Therefore, if the conveyor is actuated, it first guides the goods on the conveyor belt to the stop bar. As soon as the goods make contact with the stop bar, the conveyor belt glides between the shelf board and the goods, with the goods drawn by friction with the conveyor belt towards the stop bar, where they arrange themselves in a self-organizing manner as a result.

At the opposite side of the display side can be provided a fall-off guard, similar to the stop bar, with the guard preventing goods in the shelf from falling off the rear if pressure is applied to them from the display side. The fall-off guard may also be formed as a corresponding bar, which can be additionally designed to be movable in order that the fall-off guard may be removed when refilling of the shelf is performed from the rear, which will be described in more detail later. At the same time, the fall-off guard may also form a transition element for bridging the gap between the shelf board and a shelf-stocking vehicle delivering the goods. The transition element can comprise drive wheels, drive rolls, gear wheels or other drives and continuously circulating drive chains and/or belts. The drive and/or the transition element of the conveyor belts can be designed such that idling of the drive and/or conveyor belts on an external drive or manual drive of the conveyor belts and/or drive by a shelf-stocking vehicle, is at least adjustable or permanent.

The fall-off guard may be formed so as to be a foldable or rotatable bar or as a roller shutter or the like. The fall-off guard may also be actuated by the shelf-stocking vehicle which will be described later.

The conveyor belt for the shelf boards may be moved either manually or by a corresponding drive and/or auxiliaries, such as hand cranks, which can be coupled into a corresponding gear, or electric-motor-driven cranks in the form of hand-operated electric motors, such as drilling machines or battery-powered screwdrivers or the like, which can also be coupled into corresponding gears. Furthermore, drives arranged at the display shelves are also conceivable. In this regard, it is conceivable that one drive be provided for a plurality of conveyor belts, the drive, for example, capable of being coupled into or out of corresponding gears for driving individual or all conveyor belts at the same time. It is additionally also conceivable, as will be described further below, that automatically driven drive devices may be advanced to the corresponding conveyor belts. The drive can be provided at least partially at the shelf boards and/or the frame and/or are framed as separate components. The drive can comprise motors or electric motors, which can be permanently installed and/or manually or automatically movable towards the conveyor belt to be driven and, via coupling devices, in the form of a drive wheel, a drive roll or a gear, can be coupled to the conveyor belts and/or to the drive, such as rollers and the like, assigned to them.

According to an aspect of the present invention, for which protection is sought independently and in combination with other aspects, in the case of a display shelf comprising two or more shelf boards, of which at least one (e.g., each shelf board), has one or more conveyor belts, there is provided a central drive, which drives the conveyor belts of the entire display shelf or one module thereof centrally.

With such a central drive, it is possible to ensure continuous tracking of the goods for sale in the display shelf to the front or display side in a simple fashion. Such a drive may be operated continuously at a very low drive speed, such that the customer scarcely sees or perceives the tracking of the goods for sale to the front or display side, yet continuous tracking of the goods does in fact occur.

The central drive keeps the design and operating outlay for a display shelf low, even though the shelf may have a plurality of shelf boards arranged beside each other and/or above each other in a frame, each having one or more conveyor belts arranged beside each other. Additionally, the shelf boards may be formed and arranged differently.

The central drive preferably comprises a motor (e.g., an electric motor), which drives a continuously circulating drive chain or drive belt. The drive chain or drive belt can be coupled via coupling devices to the conveyor belts and/or the drive means assigned to them, such that indirect or direct propulsion of the conveyor belts can take place.

The coupling devices can comprise driving wheels, drive rolls, gearwheels or other drives that interact with the conveyor belts direct and/or in accordance with the drive provided at the conveyor belts. Such drive may, for example, be rollers over which the conveyor belts are guided. Here, however, other implementation possibilities are conceivable, such as direct intervention by the coupling device into the conveyor belts and guiding of the conveyor belts over simple gliding elements.

The conveyor belts or the drive assigned to them can have, comparable to the coupling devices on the drive side, a transition mechanism, such that the conveyor belts and/or the drive themselves can in turn drive one or more adjacent conveyor belts. In this way, shelf boards with a plurality of differently arranged and designed shelf boards can be provided with conveyor belts driven by means of a central drive.

The transition mechanism, like the coupling devices, may be drive wheels, drive rolls, gearwheels or other gears as well as continuously circulating drive chains or drive belts.

The conveyor belts can each be guided around two parallel rollers, with the first roller arranged at the display side of the shelf, while the second roller is provided at the rear side or interior side opposite the display side. Propulsion can occur at the second roller or generally the second drive at the rear side or interior side of the display shelf. It is contemplated that the transition mechanism for driving adjacent conveyor belts can also be provided at the second roller or the second drive means at the rear side of the display shelf.

In order that, in addition to the central drive, an external drive may be facilitated, for example for manual driving of the conveyor belt and/or propulsion by a shelf-stocking vehicle, the drive and and/or transition mechanism as well as the conveyor belts are designed such that idling at least is selectable. This may, for example, be realized by appropriate decoupling of the drive chain or the drive belt from the coupling devices.

However, permanent idling can be realized by an appropriate design of the drive through gears and the like, for example, in the replenishment direction, that is, movement towards the display side, such that, in combination with the shelf-stocking vehicle also described, or manually, additional tracking of the goods is possible.

According to a further aspect of the present invention, for which protection is sought independently and in combination with other aspects of the invention, a display shelf is provided which has at least one shelf board with a continuous conveyor belt and is formed so as to be movable. This has the advantage that the display shelves can be arranged in a space-saving manner in a store, with the display shelves capable of being refilled at the same time from the rear, such that laborious emptying of the display shelves and rearrangement of the goods can be eliminated.

Two or more display shelves can be composed to form one display shelf or one display shelf unit, more precisely such that the display sides point away from each other and the shelves are placed so that their backs face each other. Now, if at least one of the display shelves or a part thereof is designed so as to be movable, a transport route or replenishment aisle can be formed between the parts of the display shelves in order that goods for both shelf parts may be tracked from the rear into the shelf boards.

Aside from the possibility of designing only one of the display shelves or only one side or one part of the display shelf to be movable, a further possibility consists in designing all parts or both sides of the display shelf to be movable, such that only one part of the sales space in front of each display shelf or in front of each display side has to be used for forming the replenishment aisle.

It is contemplated that at least one drive device (for example, a separate drive device for each shelf part), is provided for moving the shelf part(s).

The conveyor belts of the shelf boards can be formed from a fabric or other flexible material, such as a film, for example, from plastic and from plastic fabric. These may have appropriately modified surfaces that facilitate simple gliding over the shelf board and/or at the same time, on one hand, transport of the goods and, on the other, gliding relative to the goods. The upper and lower sides of the conveyor belts may have different properties matched to the various requirements.

Additionally, it is an advantage to provide the shelf boards, especially the faces, with corresponding gliding and/or guide elements for the conveyor belts, for example, in the form of rollers, curved or rounded gliding surfaces or the like. In this way, simple gliding of the conveyor belts around the shelf boards can be achieved. It can also allow manual pushing of the conveyor belts with the palm of the hand applied to the bottom of the shelf boards.

A plurality of shelf floors can also be provided beside each other and/or above each other in the shelf or in a frame forming the shelf with shelf boards, with one or more conveyor belts capable of being arranged beside each other at one shelf board.

In order that the goods may be prevented from breaking out from the side during automatic tracking, lateral separation elements may be provided that subdivide the display shelf into corresponding compartments. The vertical struts of the shelf frame may also be used for this.

However, a flexible division into compartments using lateral dividers which may be flexibly arranged in order that flexible compartmental divisions may be formed can be used in which, within a grid spacing determined by the shelf struts, all kinds of compartments with different conveyor belts and/or a variable number of conveyor belts are arranged.

In another aspect of the present invention, the replenishment system provides for a shelf-stocking vehicle for transporting goods to a shelf, the vehicle receiving the goods on a transport surface and being automatically movable along a predetermined route. Such a shelf-stocking vehicle is characterized by the fact that a handling mechanism is assigned to the transport surface that serves to displace the goods placed on the transport surface parallel to the transport surface, such that the individual goods and very many different goods can be transferred from the shelf-stocking vehicle onto the shelf board of the shelf. Different goods in this regard means that, in various transports, all kinds of goods can be received, with transport of similar goods being preferred for any individual transport.

The handling mechanism here may take the form of one or more pushers, or, similarly to the display shelf of the invention, one or more conveyor belts may be provided which are wound around the transport surface in an endless loop.

Correspondingly, gliding and/or guide elements can be provided for the conveyor belts, for example, in the form of rollers, curved or rounded gliding surfaces or the like. The conveyor belts of the shelf-stocking vehicle may be designed so as to be identical with or similar to the conveyor belts of the display shelf.

Additionally, a drive may again be provided for the conveyor belt(s), for example, in the form of a drive roll.

An advantage in this regard is that the shelf-stocking vehicle and the display shelf of the invention can be matched to each other such that, with the assistance of the drive for the conveyor belt(s) of the shelf-stocking vehicle, the conveyor belts of the display shelf can also be driven, more precisely, for example, by means of a corresponding drive wheel, a drive shaft or a drive roll or any other gear device that can interact with the conveyor belts or the drive of the display shelves provided for this purpose. This means that, by saving on separate drives for the display shelf, costs can be kept low.

Such a shelf-stocking vehicle makes it possible to track goods into the display shelf from the rear. For example, in connection with the display shelf having conveyor belts in accordance with the invention, it is possible by means of a shelf-stocking vehicle of the invention to approach the shelf from behind, to move the goods by means of the conveyor belt of the shelf-stocking vehicle from the shelf-stocking vehicle towards the shelf, to simultaneously drive the conveyor belt of the shelf and to track the goods received there to the front of the shelf and to refill the shelf from the rear with new goods. As a result, time-consuming and labor-intensive activities are replaced by a fully automated process, such that the effort for filling the shelves is markedly reduced.

At the transition between the conveyor belt of the shelf-stocking vehicle and the conveyor belt of the display shelf, a transition element can be provided at the shelf-stocking vehicle to bridge the gap between the two conveyor belts. Alternatively, the two conveyor belts may also be guided such that they are provided virtually seamlessly beside each other or behind each other.

The simultaneous driving of the conveyor belt on the shelf-stocking vehicle and the conveyor belt in the display shelf allows synchronization of the speed of the conveyor belts.

The shelf-stocking vehicle can have corresponding movement elements, such as running wheels and/or carrying wheels, for interacting with a running rail or other movement elements that facilitate movement along a prescribed route.

Additionally, a drive can be provided at the shelf-stocking vehicle that facilitates independent movement of the shelf-stocking vehicle. Alternatively, the drive may also be integrated into the route, by a traction rope or a traction chain.

In a further embodiment, the shelf-stocking vehicle has a two-part frame, with the upper part arranged, for example, as the drive unit with the movement and drive as a suspended rail vehicle on a rail, while the lower part provides the transport surface and the handling mechanism for the goods. The division of the frame of the shelf-stocking vehicle into an upper part and a lower part has an advantage that these can be designed so as to be movable relative to each other, for example in the form of a rope, strap or belt suspension. This, in turn, has an advantage, as will be explained later, of allowing simple approach to the shelf compartments or shelf boards of the display shelf and simultaneously unimpeded transport, for example, at the ceiling of a sales room.

The handling mechanism, the drive or other movable components can have a drive in the form of an electric motor. The power supply in this connection may be secured by corresponding conductor rails on the transport route.

The transport surface can have all-round protection for the goods in the form of sidewalls and/or a cover element, such that the goods are protected against falling out and over during transport. For example, the protective cover opposite the transport surface may be designed so as to be movable and/or divided, such that goods of different height may be received and protected. In one example, the protective cover can be designed such that, when the upper and lower parts close together, it is moved against the goods and additionally protects them by wedging them with a force limited to a maximum value.

In another embodiment, the cover of aluminum or plastic has an elastic substance (e.g., on the goods side), such as foam or the like, on its underside that wedges against the goods and keeps them protected. In this embodiment, it is contemplated that the weight of the cover be sufficient for wedging in this connection.

The shelf-stocking vehicle can be provided with supporting elements, for example, movable bracing elements for lateral bracing against walls, shelves and the like, more precisely during transfer of the goods to a shelf, such that the shelf-stocking vehicle or the transport surface is firmly held, especially horizontally, during transfer. It can be an advantage here if the support elements are formed so as to be mobile in order that they, for example, can move telescopically against corresponding walls, shelves and the like. It can also be an advantage in the case of shelves standing opposite each other which form a transport aisle for the shelf-stocking vehicle to form the bracing elements such that the shelf-stocking vehicle can wedge itself against or between the shelves.

Additionally, the transport surface and/or the handling mechanism can be formed so as to be displaceable relative to the frame of the shelf-stocking vehicle or relative to the movement elements, that is, for example, the rail in which the shelf-stocking vehicle is movably mounted, in order that approach by the transport surface and/or the handling mechanism may be facilitated from the transport route towards the shelf.

From another aspect of the present invention comprises a device into which components, such as the display shelf and shelf-stocking vehicle described so far can be integrated, the device is a device for transporting goods for sale into a display shelf, wherein a shelf-stocking vehicle is movable along a transport route and automatically transports the goods to one or more display shelves and transfers them to these.

This can proceed by means of the previously described shelf-stocking vehicles in interaction with the display shelves also described previously.

The device of the invention can have a transport route in the form of one or more transport loops, which can be formed as endless loops, with the individual loops connected to each other by corresponding transfer points for the goods.

Different transport vehicles or systems, such as roller or chain conveyors and the like, may be used in the transport loops such that different transfer points can be realized. Each of the transport loops can have at least one or more transport vehicles assigned to this transport loop, with the previously described shelf-stocking vehicle of the invention used in those shelf-stocking loops which are guided towards or along the display shelf.

The transport route can extend from a delivery area where the goods are delivered by truck and/or an automated small parts store to the display shelves, with the shelf-stocking loops guided in endless loops through the display shelf.

The display shelves can be arranged relative to the transport route such that they form a transport route aisle or supply aisle between them, through which the shelf-stocking vehicles can travel. Loading of the display shelf then proceeds from the rear of the display shelves or from the transport route aisle or supply aisle.

As already described previously, the shelf-stocking vehicles and the display shelves can be matched to each other such that automatic loading and/or automatic tracking of the goods in the shelves towards the display side can be performed by the shelf-stocking vehicle.

For the purpose of temporary buffering of goods, the transport route can also have at least one temporary store in which the goods can be stored temporarily. A temporary store can, for example, be arranged above the display shelves as well.

Additionally, storage and/or supply shelves can be provided, which can also be automatically supplied or loaded by the shelf-stocking vehicle and which can provide goods, which are not sold in shelves, but rather on sales tables, such as fruit and vegetables, so that these can be made available to the employees for further processing.

With the device of the invention or the shelf-stocking vehicle, the goods can each be handled directly, or transport and/or presentation containers may be provided in which the goods are grouped together.

In one aspect of the present invention, the device of the invention can have at least one control unit, which controls the entire device, for example, during loading of the shelf-stocking vehicles, movement of the shelf-stocking vehicles, their unloading and the loading of the shelves and/or tracking of the goods in the shelves.

It is possible to install a fully automated operation for replenishment and/or tracking of the goods to a display side of the shelf. This can proceed, for example, in such a way that one or more capturing devices, for example, scanners or cameras can be provided, which capture the type, quantity and/or the position of the goods, for example, in the shelves and transfer these to the control units. The scanner(s) or camera(s) can in this regard be provided at a shelf-stocking vehicle or be movable independently along the sales or storage shelves. The data at the cash desks on the number and type of goods sold can also be included in order that replenishment of the goods may be organized.

Unpacking stations for the delivered goods may also be integrated, which facilitates automatic unpacking, for example, from standardized transport containers.

Where presentation containers are used in the shelves, repacking of the delivered goods may additionally be necessary, such that one or more repacking stations may also be integrated.

According to a further aspect of the present invention, such a repacking station has a turning module with which a transport and/or presentation container can be turned upside down, such that the goods come to rest on a support and the container can be simply removed or swapped.

The turning module can have corresponding receptacles for the container and adjustable supports that facilitate approach of the support to the goods to be received, for example, with two opposing receptacles offering the advantage of allowing two repacking processes to take place simultaneously. In one embodiment, two transport devices are assigned to the turning module for feeding and removing the containers to be swapped.

According to a further aspect of the present invention, a transfer system is provided for transferring loose goods or objects, such as bottles, cans and the like, from a transport container to a placement area, for example, the transport surface of a shelf-stocking vehicle. This transfer system, which can be integrated into the transport route of the previously described device and into a primary-supply loop with a roller conveyor there, has a transport container which is designed as a quadratic tray, which possesses a double floor and four low peripheral sidewalls. The upper floor part of the double floor is freely movable or placed loosely in the container, such that the upper floor part with the goods or objects arranged thereon can be raised in the container. This can, for example, proceed by means of a lifting device that has corresponding spikes for reaching through the lower floor part. The upper floor part is lifted to the extent that a pusher arrangement with a pusher assigned to the lifting device can push the loosely arranged goods on the upper floor part onto an adjacent placement surface, such as the transport surface of the shelf-stocking vehicle. To prevent the loose goods or objects from breaking out, guide elements for the objects to be pushed can be provided at the container and/or the pusher.

The guide elements may be designed either as sidewalls projecting over the edge of the container and/or as bars so as to be displaceable on the upper floor part. Alternatively or additionally, guide elements can be provided at the pusher arrangement, for example, as movable sliding fingers, which are guided between or around the objects, such that they are held laterally during the pushing process.

Overall, the presented logistics concept based on the individual components of the invention facilitate a fully automated replenishment of one or more retail business, such as supermarkets and the like, with a plurality of different products, such as bottles, cans, boxes and the like. Tracking of the goods in the display shelf to the front or display side is also possible fully automatically, for example, continuously or at fixed or flexible time intervals or on the basis of sales. Additionally, the individual components, also when used individually, facilitate simplification of individual handling steps that previously had to be performed manually with effort.

BRIEF DESCRIPTION OF THE DRAWINGS

Further advantages, characteristics and features of the present invention are apparent from the following description of embodiments using the enclosed figures.

FIG. 5 is a view of the display shelf from FIG. 4, rotated through 90°;

FIG. 8 is the loading station from FIG. 7 in a later stage of loading;

FIG. 8A is a view of the pushing element loaded with goods;

FIG. 11 is the view from FIG. 10 at a later stage of loading of the shelf-stocking vehicle or loading the display shelf;

FIG. 12 is a foldable transport container;

FIG. 13 is a presentation container;

FIG. 14 is a first step in the repacking process from a transport container into a presentation container in a repacking station;

FIG. 15 is a second stage in the repacking process from FIG. 14;

FIG. 16 is a third stage in the repacking process from FIG. 14;

FIG. 17 is a fourth stage in the repacking process from FIG. 14;

FIG. 18 is a plan view of a further embodiment of a shelf arrangement in accordance with the invention;

FIG. 26 is a three-dimensional partial view of a drive for the conveyor belts of a display shelf;

FIG. 27 is a side view of a separable display shelf in the closed condition; and in FIG. 28 is a side view of the display shelf from FIG. 17 in the separated condition.

DETAILED DESCRIPTION OF THE PREFERRED EMBODIMENT

Figure 1:
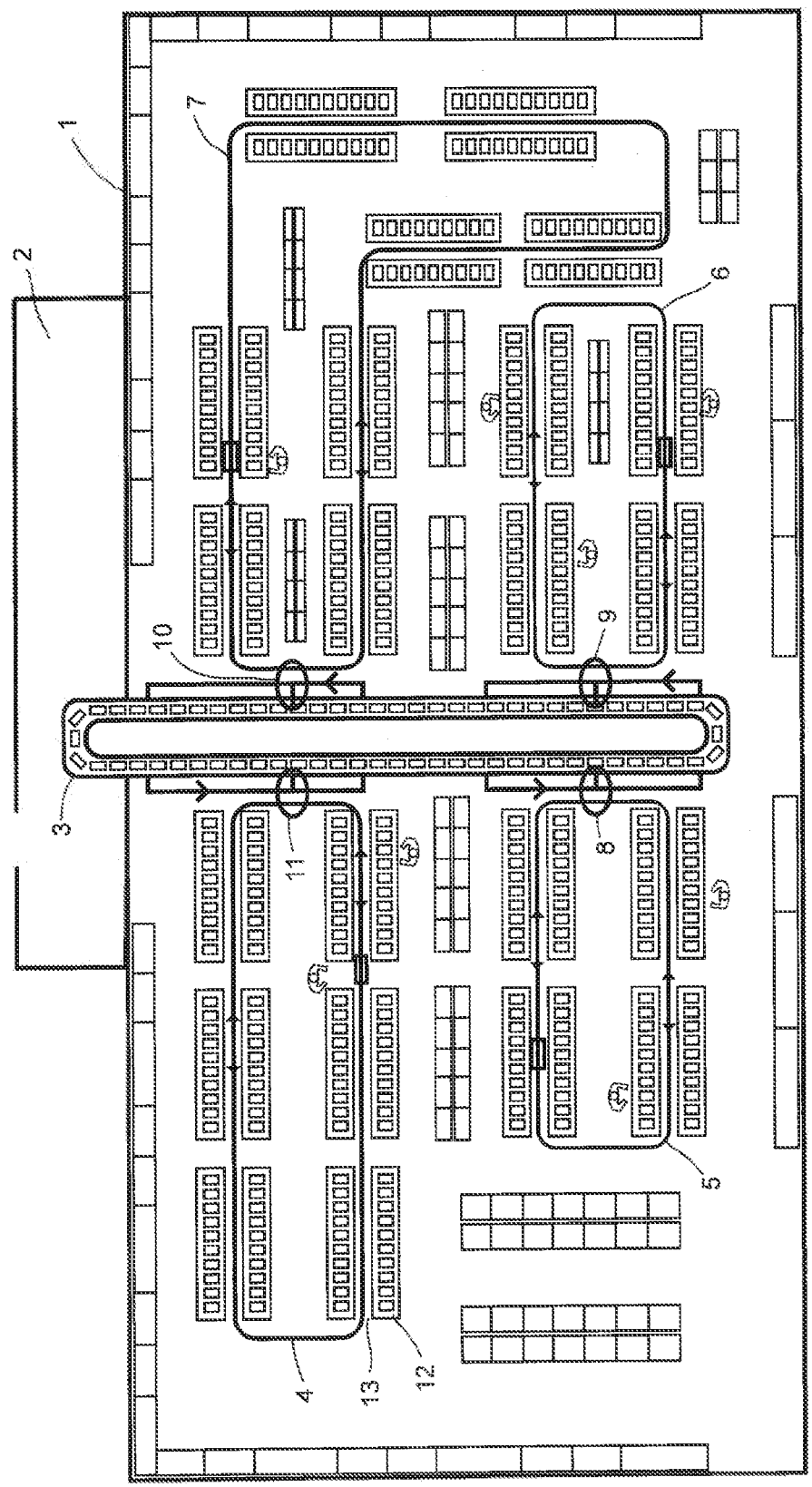
FIG. 1 is a schematic plan view of a retail business, which is fitted out with the device of the invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 is a schematic plan view of the floor plan of a retail business 1, for example, a supermarket. The sales area indicated by the rectangular floor plan, in the view shown in FIG. 1, is connected by the upper side of the figure to a delivery area 2 in which the trucks deliver the goods to be sold. Into the delivery area extends a primary-supply loop 3 of a transport device of the invention for transporting the goods to the display shelves 12. A machine for automatic depalletizing and loading the primary-supply loop 3 (not shown) may be provided in the delivery area of the area of the primary-supply loop 3.

In the primary-supply loop 3, the various goods received there are moved in a circle and transferred at transfer stations 8, 9, 10 and 11 to the shelf-stocking loops 4, 5, 6 and 7. Shelf-stocking vehicles, which will be described in detail later circulate in the shelf-stocking loops 4, 5, 6, 7. These shelf-stocking vehicles take the goods from the primary-supply loop and deliver them to the corresponding points of the display shelves 12. Either identical transport vehicles or other suitable transport devices, such as roller conveyors and the like, may be installed in the primary-supply loop 3.

Naturally, it is also conceivable to provide just a single shelf-stocking loop, such that the transfer stations 8, 9, 10, 11 and the primary-supply loop 3 can be omitted.

The shelf-stocking loops 4, 5, 6 and 7 are designed such that they can be passed through a supply aisle 13 formed between each of two display shelves 12 in order that the display shelves may be stocked from the rear while the customers, also shown schematically, can remove the goods from the front side or display side.

As will be described in detail later, the shelf-stocking vehicles, which are moved along the shelf-stocking loops 4, 5, 6 and 7, advantageously take on additionally the function of pushing the goods in the display shelves 12 to the front side of the display shelves in addition to the function of stocking the display shelves 12.

As the schematic plan of the retail business 1 in FIG. 1 shows, in addition to the display shelves 12, which are connected to the transport or supply device of the invention, additional display shelves accommodating goods, for example, that are not suitable for automatic shelf stocking, such as fresh fruit, are provided.

Figure 3:
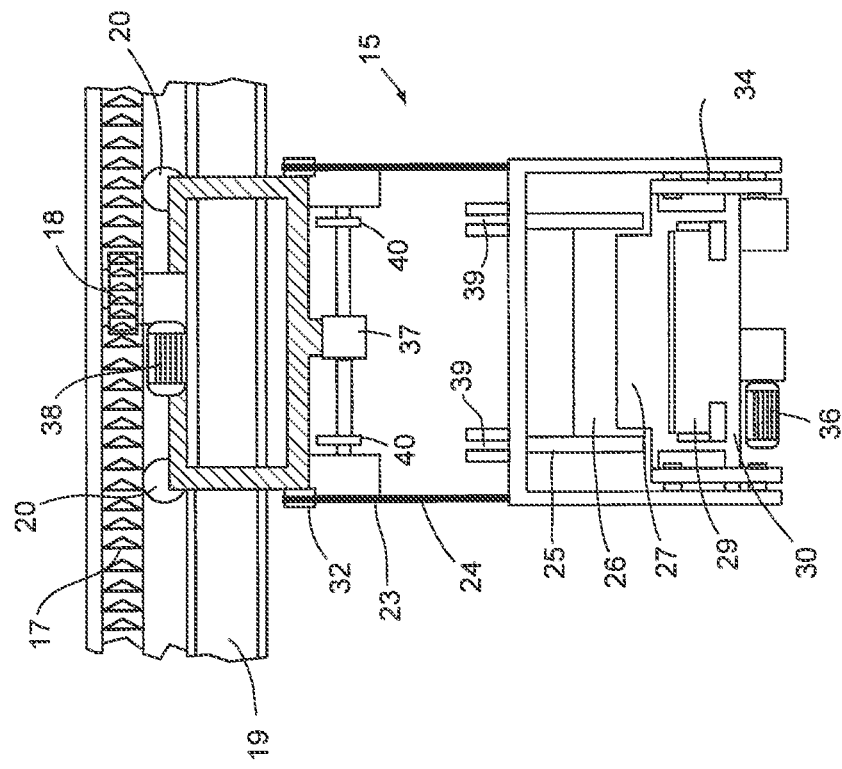
FIG. 3 is a schematic side view of the shelf-stocking vehicle from FIG. 2, rotated through 90°.
Figure 2:
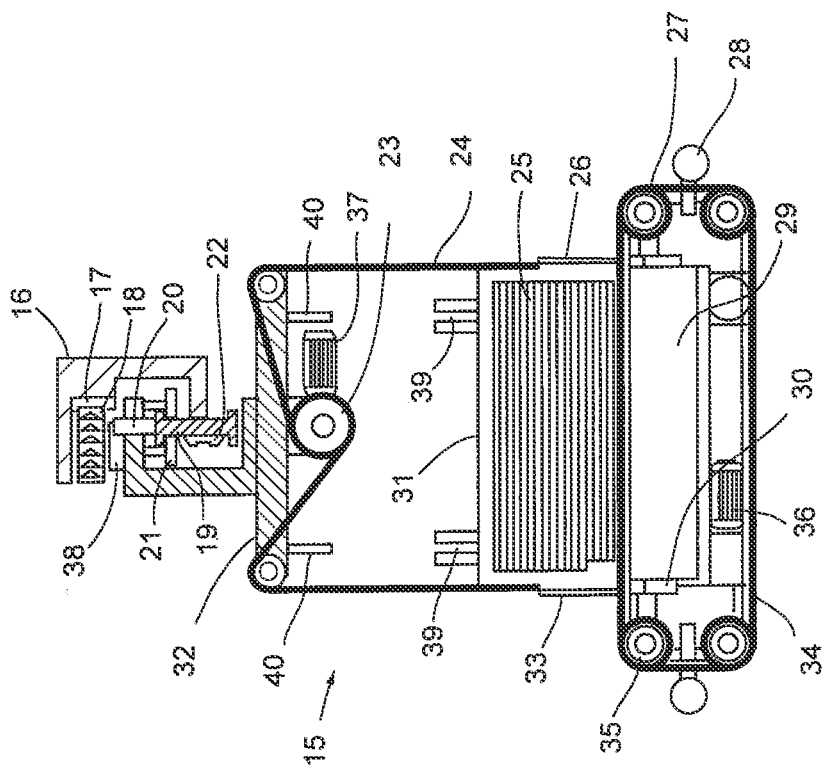
FIG. 2 is a schematic side view of a shelf-stocking vehicle.

FIGS. 2 and 3 show side views at 90° angles to each other of a shelf-stocking vehicle 15 of the invention, which can be moved along the shelf-stocking loops 4, 5, 6 and 7 of FIG. 1.

The shelf-stocking vehicle 15 is arranged movably at a running rail 19 via two running wheels 20 and guide wheels 21 arranged laterally to them, the rail in turn capable of being arranged via a ceiling suspension 16, for example at a building's ceiling. Conductor rails 22 for supplying power to the shelf-stocking vehicle 15 via contactless inductive current collectors or via sliding contacts are additionally provided at the running rail.

Furthermore, a toothed belt 17 is arranged at the ceiling suspension 16, the belt engaging with a drive belt disk 18, which is driven by an electric motor 38 and thus can move the shelf-stocking vehicle 15 along the running rail 19.

Drive belt disk 18, electric motor 38, running wheels 20 and guide wheels 21 are arranged at an upper frame part 32 of the shelf-stocking vehicle 15.

At this upper frame part 32 of the shelf-stocking vehicle 15, two belt-winding drums 23 are furthermore provided that are driven by an electric motor 37 via a gear. The belt-winding drums 23 can wind and unwind belts 24, which suspend the lower frame part 33 of the shelf-stocking vehicle. In this way, the upper frame parts 32 and the lower frame parts 33 can move relative to each other.

The lower frame part 33 has a product carrier table 29 on which the goods to be transported are stored. To protect the goods during transport, product sidewalls 25 are provided at two sides and two transport protection flaps 26 are provided at the other sides. Additionally, the storage area for the goods on the product carrier table 29 of the shelf-stocking vehicle 15 is closed off by a cover 31, whose upper side has two bushings 39 into which the pins 40 from the upper frame 32 of the shelf-stocking vehicle 15 can engage. The underside of the cover may have an elastic material, for example, foam, which, in contact with the received goods, such as bottles, holds these securely.

Above the product-basement table is a product pusher 27 which can move along the upper side of the product-carrier table 29 via a belt arrangement 34. To this end, the belt 34 needs only be moved via the rollers 35. Drive is provided by an electric motor 36.

Instead of the product pusher 27, which is connected to laterally guided belts 34, a continuous conveyor belt may be provided instead of the lateral belts 34, the conveyor belt also extending over the upper side of the product-carrier table 29. In this case, the goods are received on the conveyor belt and, by the propulsion of the conveyor belt via a drive roll, namely one of the rollers 35, the conveyor belt, which is provided in a type of endless loop, can be moved, in order that, similarly to the pushing operation of the product-pusher 27, the goods may be pushed or moved over the product-carrier table, more precisely, in accordance with FIG. 2, from left to right or, if the drive of the corresponding drive roll 35 is reversed, in the opposite direction. Thus, both loading and unloading of the shelves are possible with the shelf-stocking vehicles. This is particularly desirous if temporary stores for the goods are provided in the vicinity of the display shelves, for example, above an area accessible to the customers. Thus, the shelf-stocking vehicle not only can stock the display shelf, but can also load and unload the temporary stores.

Above and beyond that, the two-sided pusher for the goods accommodated on product-carrier table 29 is also desirous because the shelf-stocking vehicle, which moves through the supply aisle 13 (see FIG. 1), is intended to load and supply the shelves both left and right of the aisle.

Accordingly, bilateral support and/or guide rollers 28 are provided as well, which serve the purpose of support and/or guiding at the shelves.

Figure 4:
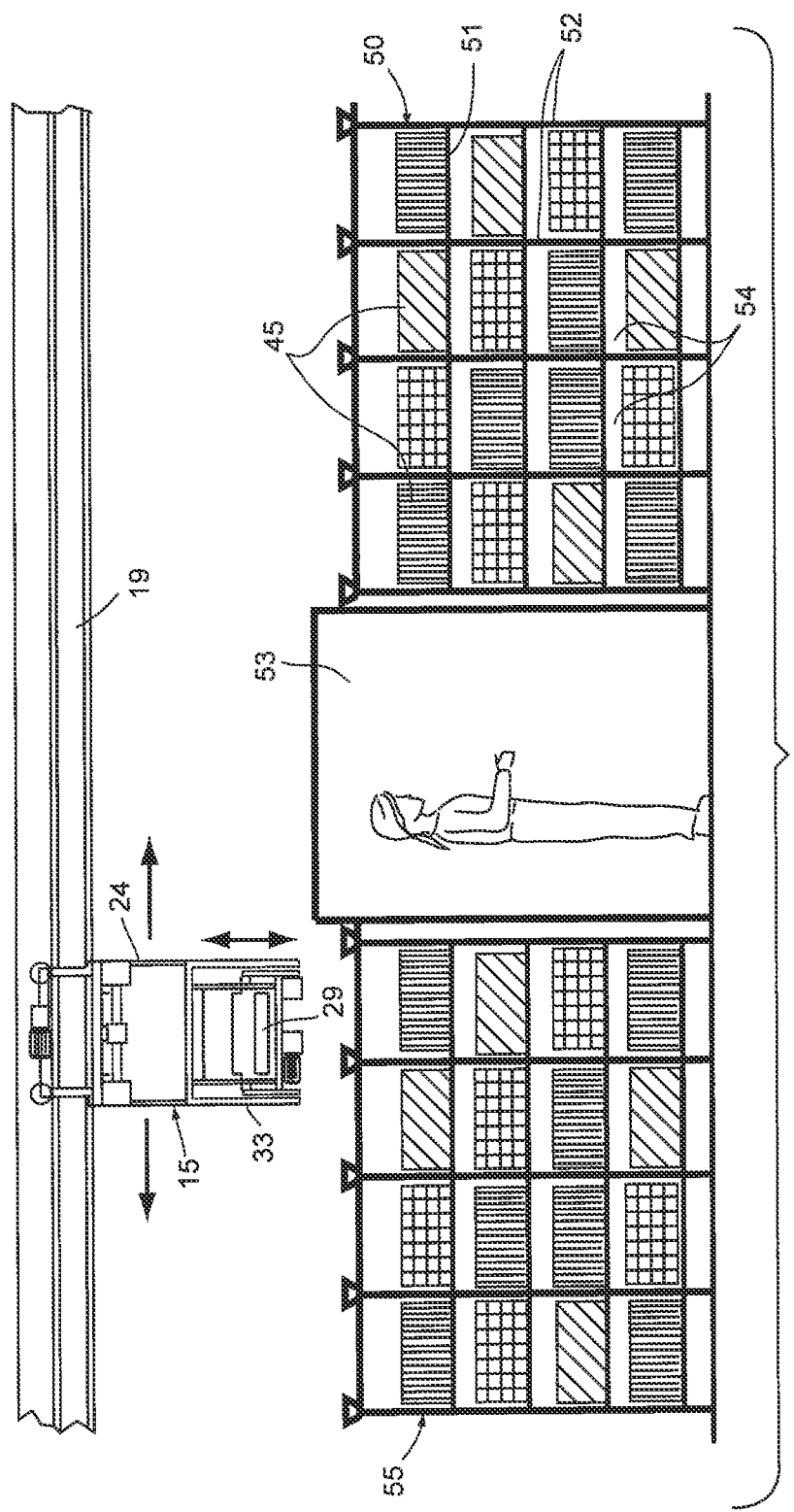
FIG. 4 is a view of a display shelf and a dedicated shelf-stocking vehicle.

FIG. 4 shows a side view of a display shelf 50, which can be loaded automatically by a shelf-stocking vehicle 15.

Shelf 50 has a plurality of vertical struts 52 in which the shelf boards 51 are accommodated on which the sales articles in a compartment 54 can be stored. The shelf-stocking vehicle 15 can be moved along the running rail 19, which, for example, is arranged at the ceiling of the sales room, along the display shelf 50, as indicated by the two horizontal arrows left and right of the shelf-stocking vehicle 15 in FIG. 4. Additionally, the lower frame part 33 of the shelf-stocking vehicle can be moved up and down via the belt suspension 24, as indicated by the double arrow in FIG. 4. In this way, the shelf-stocking vehicle can approach each compartment 54 of the shelf 50, since, on account of a two-dimensional movement along the x- and z-direction of three-dimensional space, the product-carrier table 29 can be aligned with each shelf board 51 of shelf 50.

The vertical movement capability of the lower frame part 33 of the shelf-stocking vehicle 15 can also be advantageous because it can ensure that, between different shelves, such as shelves 50 and 55 of FIG. 4, through-passage of customers 53 is ensured without any problems of collision with the shelf-stocking vehicle. The shelf-stocking vehicle 15 can namely be moved through the raised lower frame part 33 above the customer passageway 53.

FIG. 5 shows the display shelf arrangement of FIG. 4 at a 90° angle.

Here, the supply aisle 13 can be clearly seen in which the shelf-stocking vehicle 15, which is shown in detail in FIGS. 2 and 3, is movable.

In the embodiment shown, the display shelf 50 with display side 56 and supply side 57 is shown on the left side, whereas, on the right side of the supply aisle 13, a supply shelf 58 is provided in which goods which are not suitable for automatic replenishment are made available in transport and/or presentation containers 59 for sorting and loading of the display stands by employees. This has the advantage that the employees themselves do not have to move the containers with the goods for sale through the retail business, but that the goods in the containers 59 can be made available in the vicinity of the display stands. The containers 59, too, are delivered by means of the shelf-stocking vehicle 15 into the supply shelf 58.

Figure 6A:
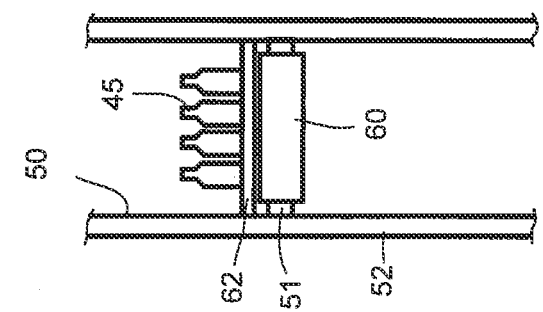
FIG. 6A is a plan view of the shelf boards of the display shelf of FIG. 6.
Figure 6:
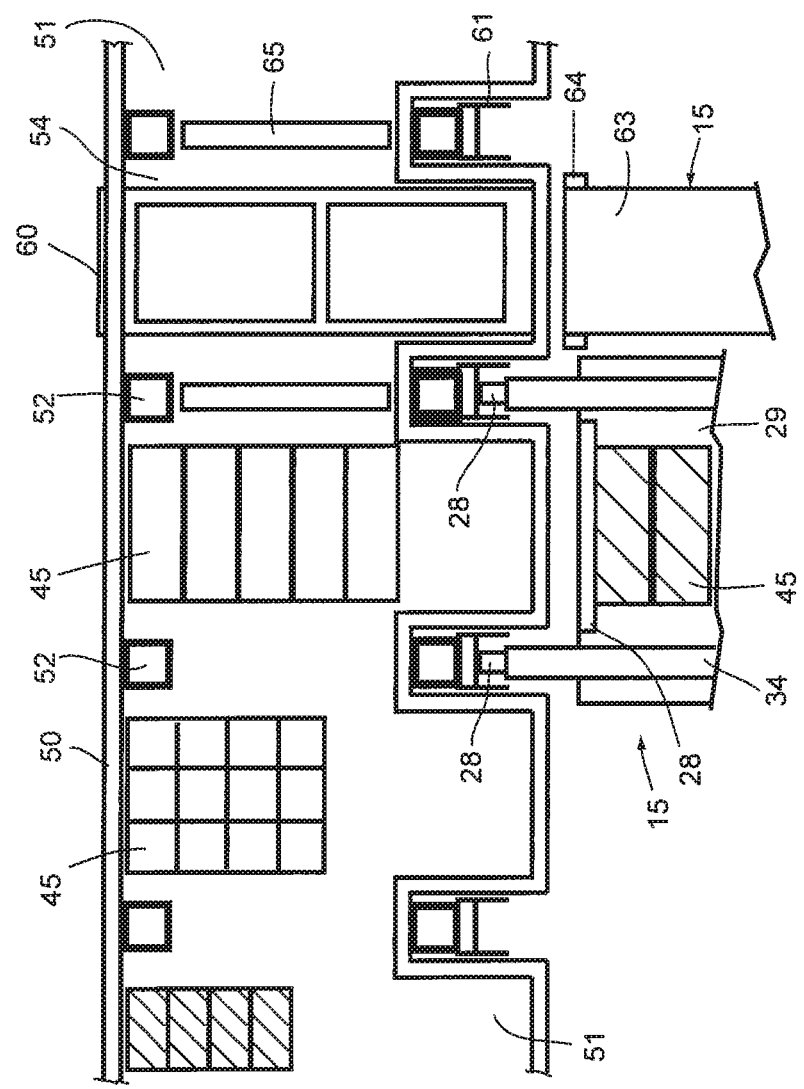
FIG. 6 is a cross-sectional view through a display shelf.

FIG. 6 shows a horizontal section through a display shelf 50, whereas FIG. 6A shows a partial view from the display side of the shelf 50.

In accordance with the horizontal view through the display shelf store 50, a shelf board 51, which is mounted by the vertical struts 52, is visible in a plan view. The goods to be sold 45 are arranged on the shelf board 51.

Loading now proceeds in such a manner that the shelf-stocking vehicle 15 approaches shelf 50 from the rear, with the support and/or guide rollers 28 engaging with the running rails 61 of the shelf.

As soon as the transport protection flap 26 of the shelf-stocking vehicle 15 opens, the product pusher (not shown) can, via propulsion of the belt arrangement 34, push the goods for sale 45 towards the shelf 50, with either the stowed transport protection flap 26 or an additional bridging element closing the gap between the shelf board 51 and the product-carrier table 29.

FIG. 6a) shows furthermore a shelf compartment 54 which is fitted with an endless conveyor belt 60 which winds its way rotatably around shelf board 51.

As is further shown schematically, to this end can be provided a shelf-stocking vehicle 15, which also has a conveyor belt 63, which extends on the upper side of the product-carrier table 29 and is guided in an endless loop below the product-carrier table 29 in a circle. Conveyor belt 63 can be set in motion via drive roll 64, such that the part of the endless conveyor belt 63 on the product-carrier table 29 is moved towards the shelf 50 or in the opposite direction. In this way, it is possible to transport or push the goods on the conveyor belt 63 of the shelf-stocking vehicle 15 towards the shelf compartment 54.

Since the drive shaft 64 of the conveyor belt 63 of the shelf-stocking vehicle 15 simultaneously drives the conveyor belt 60 of the shelf compartment via a gear (not described in more detail), for example, via a drive wheel or a drive shaft, the goods can be transferred without any problem from shelf-stocking vehicle 15 to the display shelf 50.

In particular, it is also possible with such a design of the shelf compartment 54 in accordance with the invention to move the goods for sale as far as the front side or display side of the display shelf 50. For this purpose, as shown in FIG. 6A, a narrow stop bar 62 is provided at the front side or display side of the display shelf 50 to prevent the goods for sale 45, such as the bottles illustrated in FIG. 6 b), from being transported further, while the conveyor belt 60 can glide between shelf board 51 and the goods 45. In this way, not only is simple stocking of the shelf 50 possible, but automatic tracking of the goods to the front side or display side of the display shelf 50 can occur, once customers have removed goods.

To be sure, this is also possible in a pure pushing process, such as, for example, in the case of the shelf-stocking vehicle 15, if a corresponding stop bar 62 is provided at the front side of the shelf 50. However, the further movement of the conveyor belt 60 induces a self-organizing arrangement of the goods 45 at the stop bar that would not be possible in the case of a pure pushing process.

Above and beyond that, the provision of a conveyor belt in connection with shelf boards, such as are shown in FIG. 6 for compartment 54, is also beneficial because, even independently of a shelf-stocking vehicle, tracking of the goods to be sold to the display side of the shelf 50 is simply possible if corresponding drives for the conveyor belt are provided at shelf 50 or if the conveyor belt 60 is moved manually, preferably via a corresponding gear device or with a corresponding manual machine in the nature of a drilling machine or a battery-powered drill screwdriver such that the goods arranged thereon reach the front side of the display shelf.

Although FIG. 6 shows only one compartment of the display shelf 50 with a corresponding conveyor belt 60, naturally, all compartments of the shelf 50 can be provided with corresponding conveyor belts 60, with several conveyor belts 60 possibly provided in one compartment and the widths of the conveyor belts being different. In so far, the various possibilities illustrated in FIG. 6 are to be seen as alternative embodiments, which do not necessarily have to be used alongside each other.

In order that goods may be prevented from breaking out into adjacent compartments in the case of self-organizing tracking of the goods to be sold to the display side of the display shelf 50, dividing walls 65 can be provided between the compartments.

Figure 7:
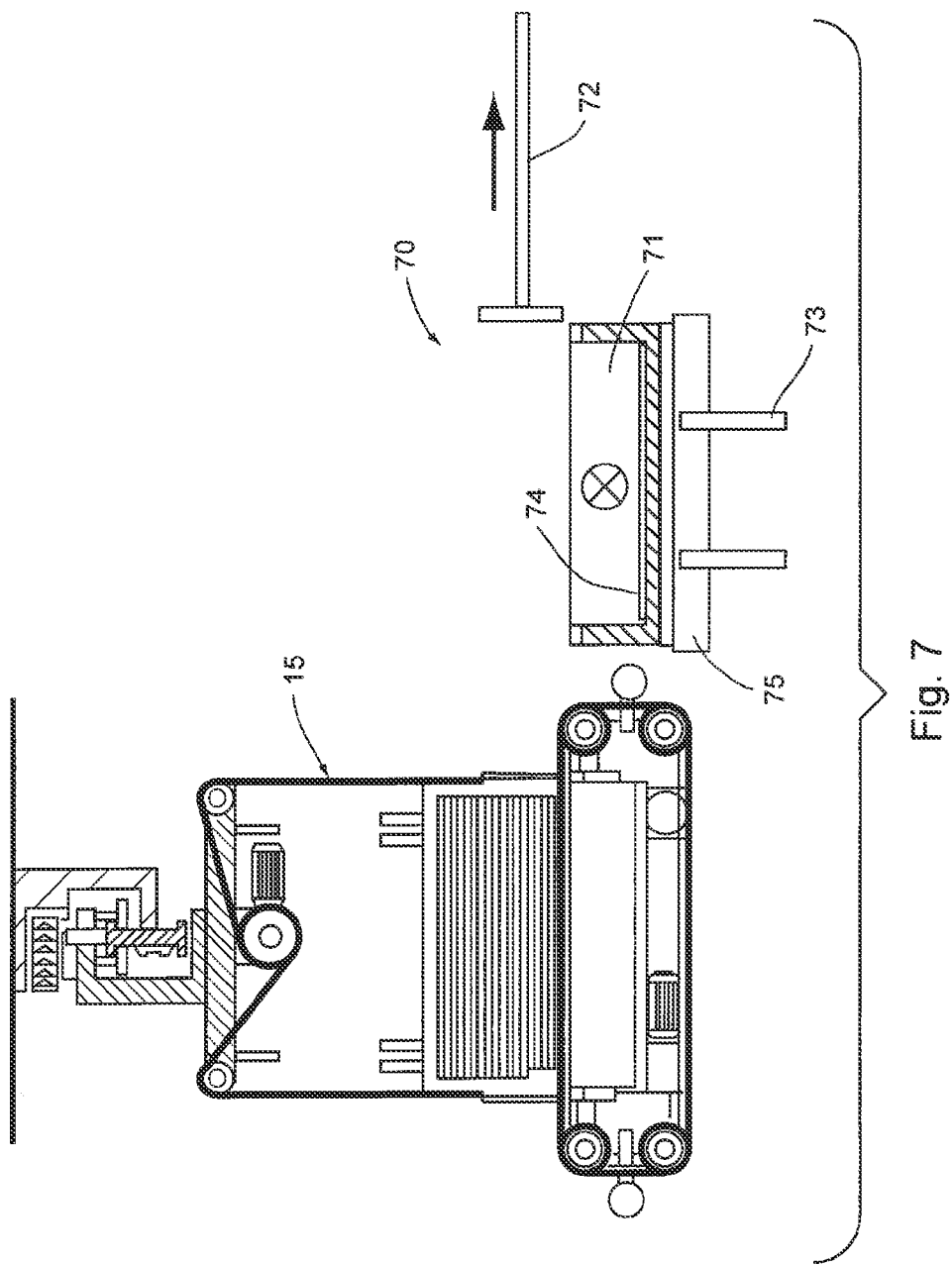
FIG. 7 is a side view of a loading station for a shelf-stocking vehicle.

FIG. 7 shows a shelf-stocking vehicle 15 in a loading station 70.

As can be seen in FIG. 7, the goods are delivered, for example, in a transport container 71, a so-called replenishment tray, which has a box-like shape and possesses an additional movable temporary floor 74 on which the goods are arranged. In the loading station 70 for the shelf-stocking vehicle 15, the temporary floor 74, as may be seen in FIGS. 8 and 8A as well is lifted up via lifting bars 73, such that the temporary floor 74 is on a plane with the upper side of the product-carrier table 29, with the pushing element 72 then pushing the goods 45 onto the product-carrier table 29 of the shelf-stocking vehicle 15. Thereafter, the transport protection flap 26, which was opened during the loading process, can be closed again, such that the goods 45 are stored safely on the shelf-stocking vehicle 15.

Figure 9:
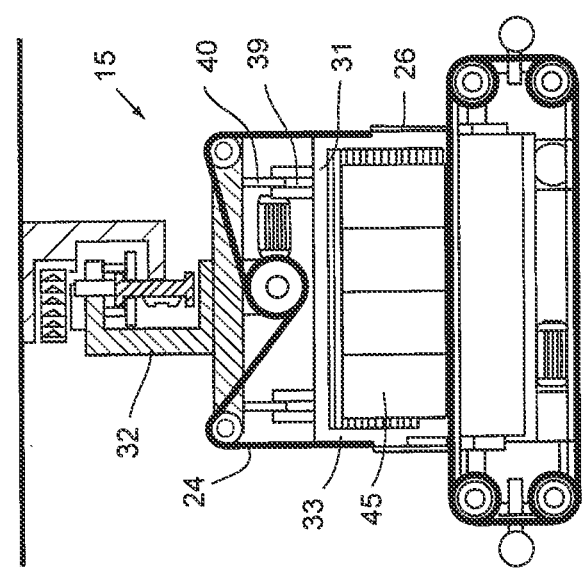
FIG. 9 is a side view of a shelf-stocking vehicle in transport position.

FIG. 9 shows the shelf-stocking vehicle 15 in the transport condition, in which the upper frame part 32 and the lower frame part 33 have closed towards each other and are fixed in position via the sleeves or bushings 39 and the pins 40. The belt of the belt suspension 24 here is in its maximum wound-up position. In this position, the movably mounted cover 31 is arranged firmly on the goods 45, such that these are held firmly on all sides.

Figure 10:
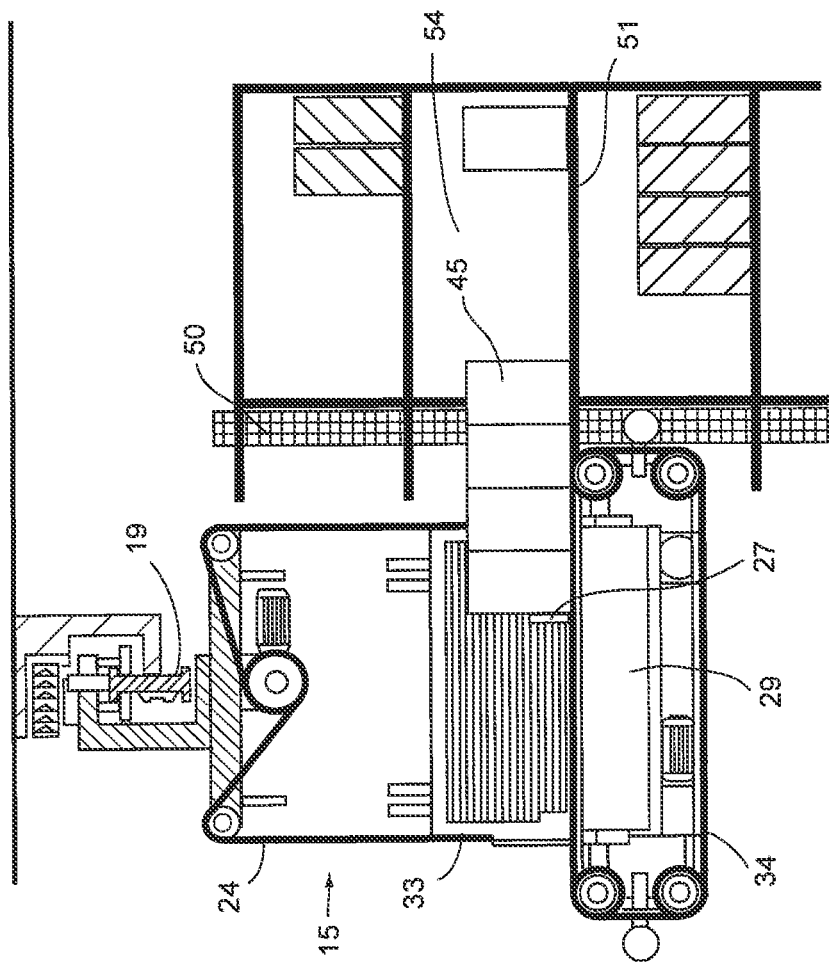
FIG. 10 is a side view of a shelf-stocking vehicle during loading of a display shelf.

FIG. 10 shows the unloading of the shelf-supply vehicle 15. The shelf-stocking vehicle is first moved along the running rail 19 until it is opposite the corresponding column of the shelf compartment 54 of the display shelf. This means that the shelf-stocking vehicle 15 is moved perpendicular to the plane of the diagram along the running rail 19 until the correct position is obtained. Then, via the belt suspension 24, the lower frame part 33 with the product-carrier table 29 is vertically adjusted until the upper side of the product-carrier table 29 is aligned flush with the shelf board 51 of the corresponding shelf compartment, such that the pusher 27 can push the goods 45 into the shelf 50 driven by the belts 34.

As can be seen in FIG. 11, the telescopic fork 30 can be used to push the goods 45 the corresponding distance into the display shelf.

The use of alternative shelf-stocking vehicle 15 illustrated in FIG. 6 in collaboration with a corresponding display shelf fitted with conveyor belts 60 would eliminate such additional propulsion. Instead, the goods can be automatically filled into the shelf and moved to the display side of the shelf compartment by means of the drive of the conveyor belts both from the shelf and from the shelf-stocking vehicle.

In the embodiments so far, the goods 45 were mostly inserted directly without any other containers into the shelf-stocking vehicle or into the display shelf. However, it is alternatively possible to use a combined transport and presentation container 80, as shown in FIG. 12, or a pure presentation container 90, as shown in FIG. 13.

The transport container 80 can have foldable sidewalls, which can, for example, be folded on the floor 84 to provide space-saving return transport of the transport containers. Above and beyond that, however, the combined transport and presentation container 80 can additionally have a presentation flap 86 at one side, which exposes one part of the side 85. Additionally, however, the sidewall 85 can be designed so as to fold in on the floor 84.

In the pure presentation container 90, one sidewall 91 is very reduced, more precisely to a narrow stop bar. The adjacent sides 92 and 93 have chamfers to simplify presentation of the products even further. Only the back wall 94 is designed so as to be comparable to a sidewall of the transport container 80.

When a presentation container is used in the retail business, for example a supermarket, the goods have to be unpacked from the transport container in which they are delivered and packed into the presentation container 90 in which they are displayed in the shelf.

To this end, a repacking station 100 is provided which has pusher devices 101 and 102 in two planes inside a transport device, for example a roller conveyor (not shown). A turning module 103 is assigned to the pusher devices 101 and 102, the turning module having a receptacle 104 in the form of a quadratic housing, that in turn, relative to the pusher devices 101, 102, has an opening 108 for receiving a transport container 80. As soon as the transport container 80 along with the goods contained therein is arranged in the receptacle 104 of the turning module 103, a carrier 106 with corresponding telescopic supports 107 moves towards the goods 45 in order to stabilize the position of the goods 45. Thereafter, as shown in FIG. 15, the turning module is swiveled through 180° such that the transport container 80 is now upside-down. The telescopic supports 107 are then retracted, such that the goods 45 on the carrier 106 are removed from the container 80, which is supported by the container support 109 and the outer wall 110 of the receptacle 104. Now, as the arrow in FIG. 15 indicates, the transport container 80 can be removed from the receptacle 104, with the pusher device 101 now functioning as by traction device.

After the transport container 80 has been transported away by the conveying device (not shown), the presentation container 90 can be advanced and inserted via the pusher device 101 into the receptacle 104 of the turning module 103. The carrier 106 is then moved upwards via the telescopic supports 107, as indicated in FIGS. 16 and 17, such that the goods 45 are arranged in the presentation container 90. After a further rotation of the turning module 103 through 180°, the presentation container 90 filled with the goods can be removed from the receiving space 104 of the turning module 103 by the pusher and traction device 102 for transfer to the assigned conveying device (not shown).

FIG. 18 is a plan view of a schematic arrangement of two display shelves 160 and 161, which between them form a supply aisle in which the shelf supply vehicle 150 can be moved back and forth in accordance with the arrows. The shelf-stocking vehicle 150 has two conveyor belts 151 and 152, with which the goods arranged thereon can be transferred into the shelves 160 and 161.

The shelves 160 and 161 have, in a predetermined grid spacing, shelf uprights 167, between which the shelf boards are arranged.

In regard to the shelf boards, similar or different conveyor belts 162 and 163 may be arranged in a different number in order that flexible compartmental divisions may be formed in the shelves 160 and 161. Since the shelf-stocking vehicle 150 can be positioned at any arbitrary point of the shelf 160 or 161, highly flexible compartmental division is possible. Several articles can be sorted onto one shelf board, i.e., flexible shelf compartments can be formed.

To protect the goods in the shelves, for example from being pushed to the rear by customers from the display side 164, fall-off guards 166 are provided at the rear sides of the shelves 165, wherein the guards can be movably arranged in order that loading of the shelves from the rear may be facilitated. During loading, the fall-off guards 166 are then moved away, as is evident in FIGS. 19 and 20 as well.

Figure 19:
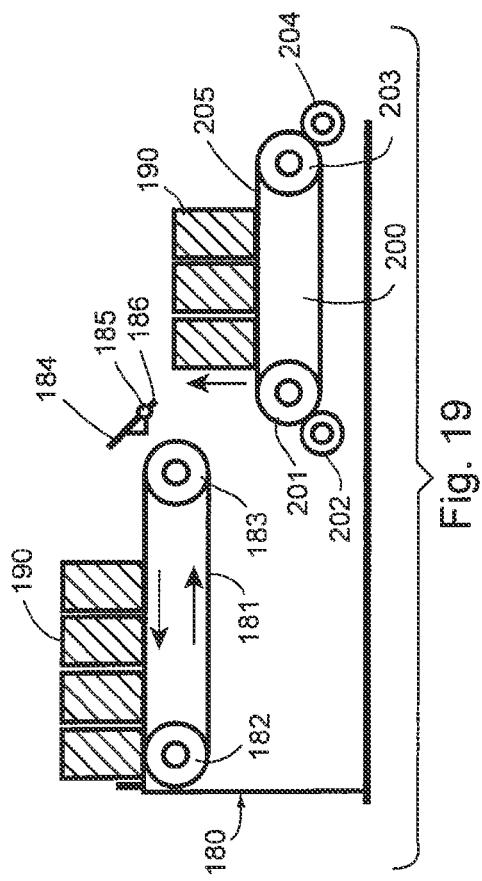
FIG. 19 is a side view of a display shelf and a shelf-stocking vehicle.
Figure 20:
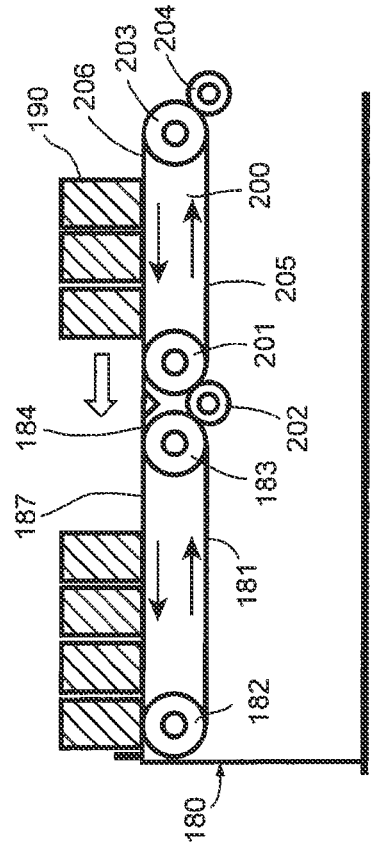
FIG. 20 is a side view of the display shelf and the display shelf from FIG. 19 in another processing stage.

FIGS. 19 and 20 show further embodiments of a display shelf 180 and an assigned shelf-stocking vehicle 200 in a schematic side view. Shelf 180 has a plurality of shelf boards or display surfaces, which have a circulating belt or circulating conveyor belt 181 that is guided via rollers 182 and 183 in the illustrated embodiment. In this way, the goods 190 arranged in the display compartment can be tracked simply to the display side, which is indicated on the left side of FIG. 19.

At the rear of shelf 180 is provided a fall-off guard 184 which is mounted rotatably or swivelably via a pivot 185. In the condition shown in FIG. 19, the fall-off guard 184 is active, such that, in the event of unintended rotation of the conveyor belts 181 in the opposite direction or squeezing or pushing of the objects for sale 190 towards the rear of the display shelf 180, the objects for sale 190 are prevented from falling off because they come up against the fall-off guard 184, which is provided in the form of a rotatable bar.

The shelf-stocking vehicle 200, which has also loaded objects for sale 190 for replenishing a display compartment, also has a conveyor belt 205 which is guided rotatably about rollers 201 and 203. Additionally, drive rolls 202 and 204 are assigned to the rollers 201 and 203, the drive rolls capable of driving the conveyor belt 181 of the shelf compartments. In the case of shelf-stocking vehicle 200, either one or both of the rollers 201 and 203 or/and the drive rolls 202 and 204 may be driven by an electric motor.

If, as is shown in FIG. 20, shelf-stocking vehicle 200 is made to approach the display compartment from below, such that the transport surface 206 is aligned flush with the storage surface 187 of the display shelf 180, the fall-off guard 184 is rotated by contact of the roller 201 or an assigned part at the appendage 186 about the pivot bearing 185, such that the gap between the transport surface 206 and the storage surface 187 in the display shelf 180 is closed. At the same time, drive roll 202 comes into contact with roller 183 such that, given corresponding propulsion of roller 201 directly by an electric motor or via the transport conveyor belt 205, the drive roll 202 is also driven, which in turn drives the roller 183 and thus conveyor belt 181 of the shelf 180. As indicated with an arrow, the objects for sale 190 then move into the display shelf.

Figure 21:
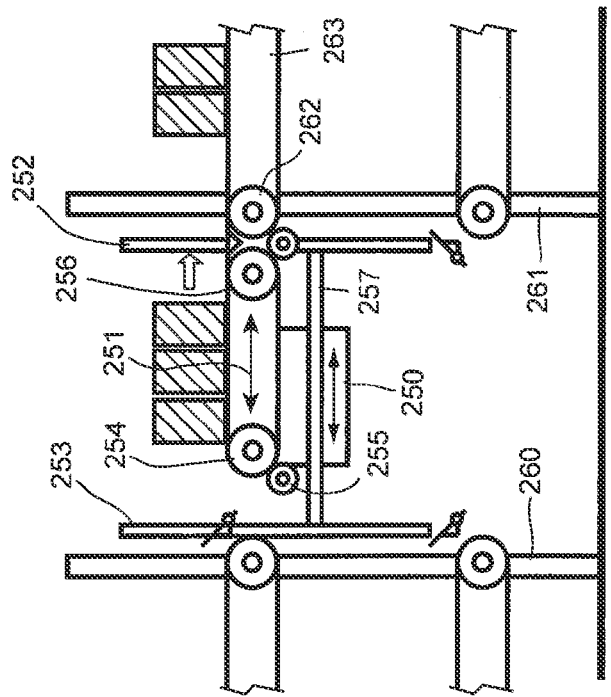
FIG. 21 is a side view of a further embodiment of a display shelf and a shelf-stocking vehicle during mutual interaction.

FIG. 21 shows a further schematic side view of a shelf-stocking vehicle 250 in a supply aisle between two shelves 260 and 261. The shelf-stocking vehicle 250 has longitudinal support elements 252 and 253, which are movable either via a telescopic mount 257 or other suitable movement means relative to the shelf-stocking vehicle 250, such that they can make contact with and support the opposite shelves 260 and 261.

Additionally, table 251 can be moved with the transport surface or the rollers 254 and 255 or the conveyor belt 256 towards a shelf, here for example shelf 261, in order again that contact may be made with roller 262 and the conveyor belt 263 of the display compartment, such that the goods from the shelf-stocking vehicle 250 can transfer to conveyor belt 263 of the shelf compartment.

Wedging of the shelf-stocking vehicle 250 in the supply aisle between shelves 260 and 261 can ensure localized mounting, for example, horizontally, during the transfer process. It can be advantageous if one or more support elements 253 at one side of the shelf-support vehicle opposite the transfer side are supported during the transfer process at the shelf. At the transfer side, support is already provided by the contacted rollers.

Figure 23:
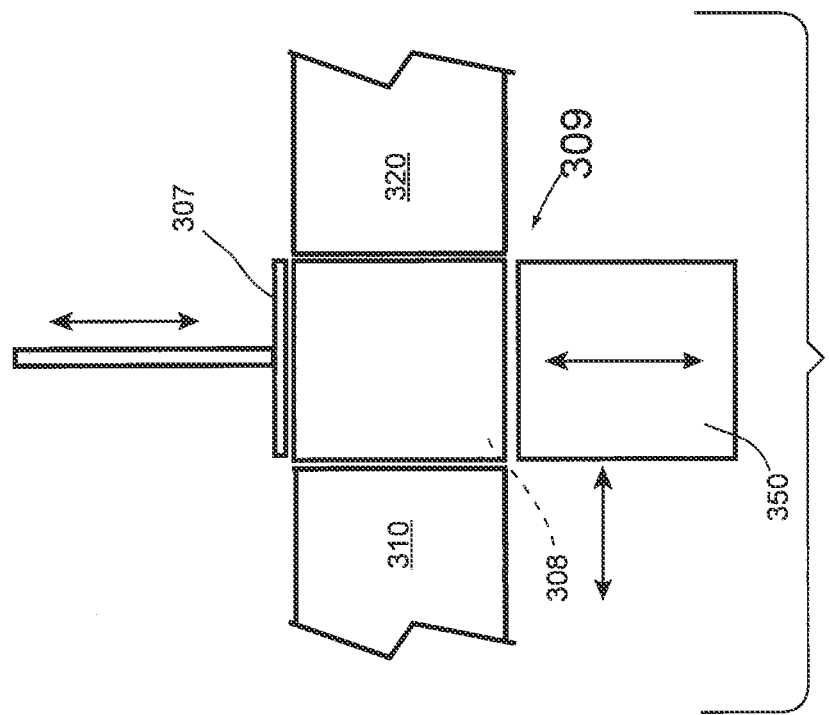
FIG. 23 is a plan view of a transfer station.
Figure 22:
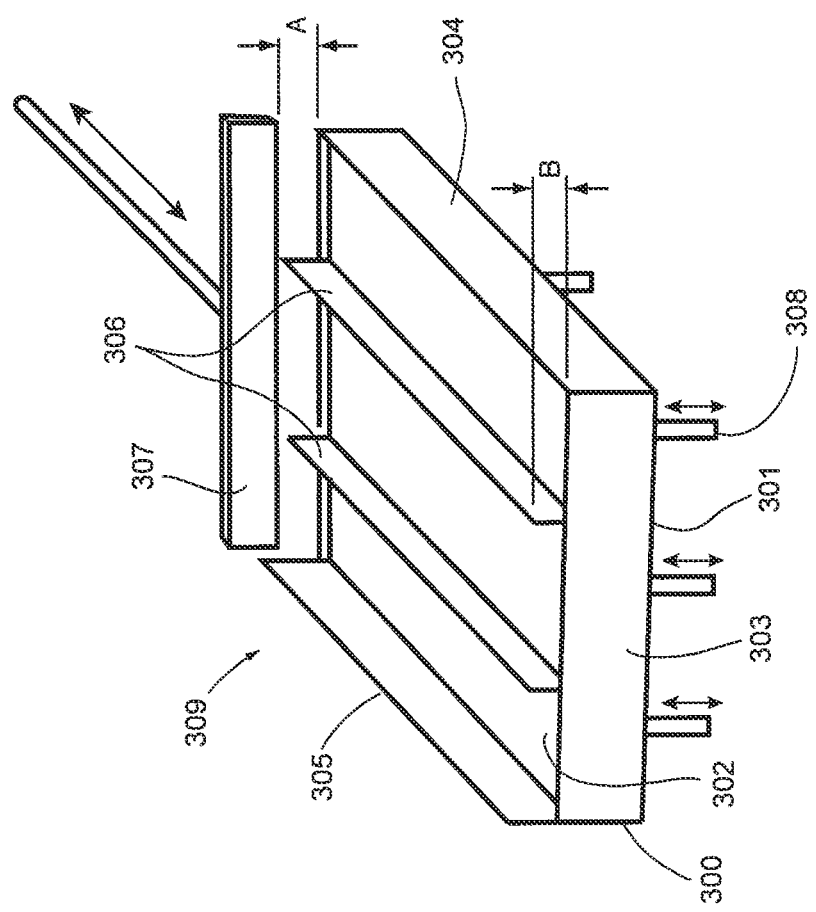
FIG. 22 is a three-dimensional view of a part of a transfer station.

FIGS. 22 and 23 show a transfer system or a transfer station of the kind that can, for example, be realized at the transfer stations 8, 9, 10 and 11 of the primary-supply route 3.

The transfer system comprises a container 300, movable along the transport route, the container having a quadratic basic structure with a floor 301 and surrounding sidewalls 303 and 304. On the floor 301, a further floor part 302 is inserted, such that a double floor construction with a loose, freely movable floor part 302 is created.

The upper floor part 302 can be raised by lifting spikes 308 of a transfer station 309 until the upper side of the upper floor part 302 projects over the sidewalls 303 and 304 or is aligned flush with their upper sides.

In the embodiment shown, bars 306 are additionally provided at the upper sides of the upper floor part 302, the bars, together with a raised sidewall 305 of the container or of the upper floor part, forming guide elements for pushing the goods on the upper floor part 302. The bars may be adjustably arranged transverse to the pushing direction of the pusher 307 in order that different goods may be received. The goods, such as loose bottles, cans and the like, can then be pushed by the pusher 307 from the upper floor part 302 to an adjacent placement surface, such as is indicated, for example, by the reference 350 in FIG. 23, with this placement surface preferably being identical with the driven transport surface of a shelf-stocking vehicle. However, provision of other placement surfaces is also conceivable.

As also shown in FIG. 23, the transfer station 309 is integrated into a transport route, such as the primary supply route 3, with the latter formed by adjacent roller conveyors 310 and 320. Naturally, other transport means are also conceivable here.

Figure 24:
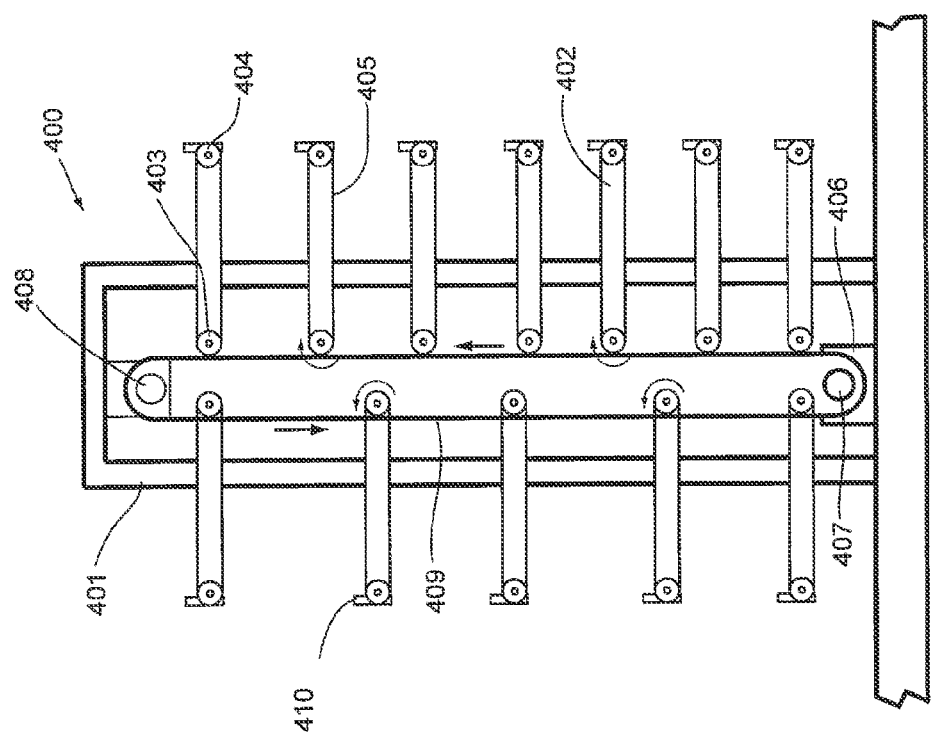
FIG. 24 is a side view of a further embodiment of a display shelf.

FIG. 24 shows a display shelf 400, which has a frame 401, on both sides of which a plurality of shelf boards 405 are arranged. The shelf boards each have a conveyor belt (not shown in any more detail) which is guided around the drive roll 403 and deflecting roller 404 at the end faces of the shelf boards 405.

At the display side, the shelf boards 405 have a stop bar 410, which prevents goods from falling down during automatic tracking of the goods for sale by the conveyor belts.

In the interior or at the side of the frame 401 is provided the drive for the shelf boards 405 or their conveyor belts, the drive comprising an electric motor 406 and a drive belt 409. The drive belt 409 in the form of a continuous belt is guided around the drive shaft 407 of the electric motor 406 and the deflection shaft 408 at the opposing upper side of the frame The drive belt 409, which can also be alternatively formed as a drive chain or a comparable design, makes contact with the drive rolls 403 at the inside of the shelf boards 405 and drives these accordingly. To ensure transport of the conveyor belt at the upper side of the shelf boards 405 outwards, the drive belt 409, on one side, makes contact with the outside of the drive rolls 403, whereas, on the opposite side, it is provided with the reverse direction of movement at the inside of the drive rolls 403. To obtain good contact pressure of the drive belt against the drive rolls 403 of the conveyor belts, corresponding counter-rollers, for example, spring-mounted counter-rollers may be provided, which, for the sake of simplicity, are not shown.

With the display shelf of FIG. 24, it is possible to have continuous replenishment of goods to the front side or display side of the shelf boards 405. To this end, the electric motor 406 need merely ensure slow transport of the conveyor belt on the shelf boards 405 towards the display side via the drive belt 409. In this connection, an extremely slow speed can be chosen such that continuous transport can be set.

Additionally, it is also possible to operate the drive only intermittently, for example, at intervals or on request from a corresponding control device.

Figure 25:
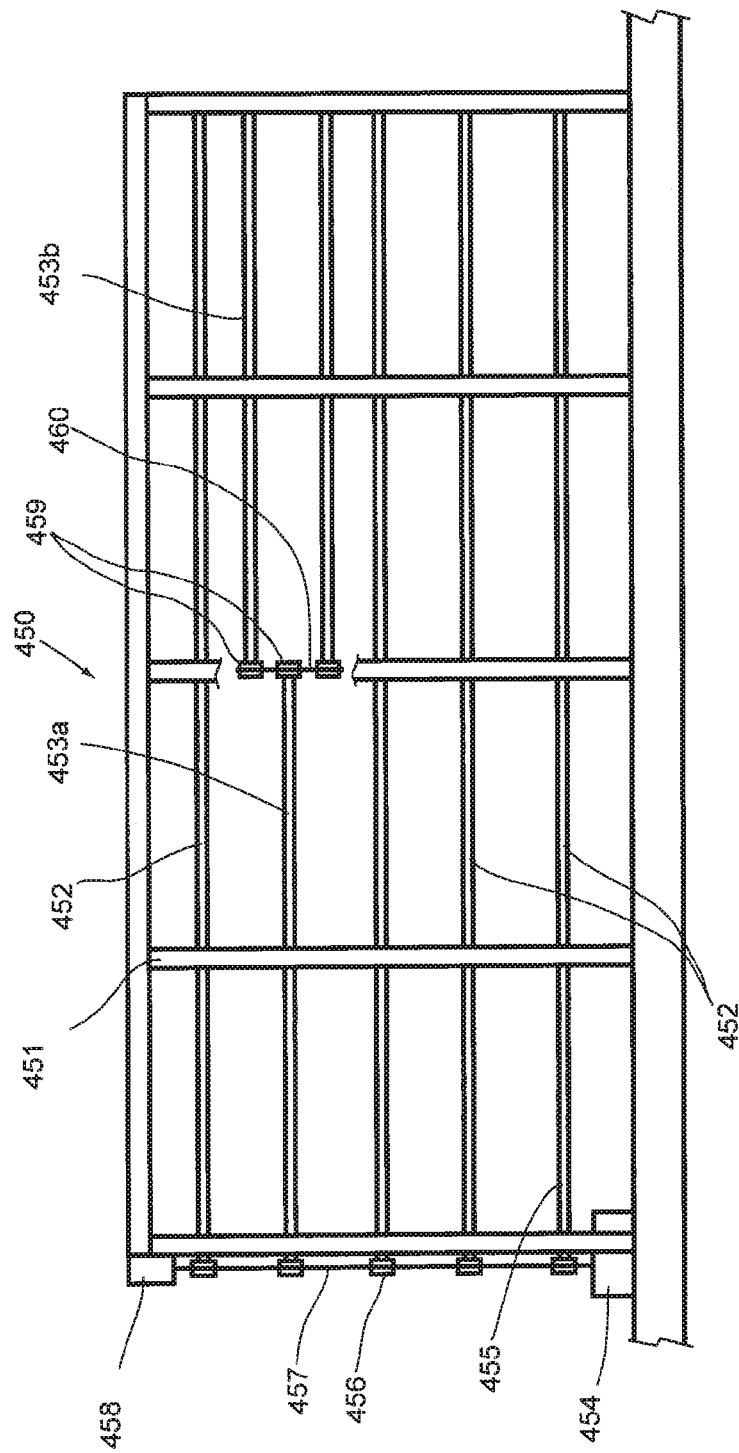
FIG. 25 is a side view of yet a further embodiment of a display shelf.

FIG. 25 shows a further embodiment of a display shelf 450 in which various shelf compartments or shelf boards 452 and 453a,b are arranged in a frame 451.

While the shelf boards 452 each have a drive shaft 455, which is arranged along the entire length of the display shelf, the drive shaft for the shelf compartments 453a,b is arranged merely for a subsection of the display shelf.

In order to allow here as well that the conveyor belts of all shelf compartments or shelf boards are driven by a central drive, a so-called over-drive, which is formed by the drive wheels 459 and the continuous belt 460, is provided. At adjacent shelf boards 453a and 453b, a drive wheel 459 is provided at the corresponding drive rolls, over which runs continuous belt 460, such that the drive of the first drive roll of the shelf board 453a can be transferred to the drive roll of the shelf board 453b.

The drive roll of the shelf board 453a is executed via an electric motor 454 and a continuous drive chain 457, which engages with drive wheels 456 of the drive rolls of the respective shelf boards. The drive chain 457 is guided over a housed deflecting shaft 458.

FIG. 26 is a further representation of a drive for a display shelf of the invention in which, again, a drive belt 507 is guided in an endless loop via the drive shaft 506 of an electric motor 500 and a deflecting shaft 508. In the display shelf, for which the drive of FIG. 26 is provided, short shelf boards 501 and long shelf boards 502 are provided, with the drive having the drive belt 507 driving both the drive rolls 504 and also 510 of the short 501 and long 502 shelf boards.

Through the drive of the drive roll 504, the conveyor belt 503, which is guided as an endless loop around the drive roll 504 and the deflecting roller 505 of the shelf board 502, is driven to convey the goods for sale towards the display side. In the same way, the drive roll 510 of the short shelf board 501 is driven in order to move the conveyor belt with the goods accordingly. The remaining short shelf boards 501, which do not make contact with the drive belt 507, are driven via a so-called over-drive in the form of an endless over-drive belt 509 by the driven roller 510, such that here, too, a central drive for moving all conveyor belts in the various and differently arranged shelf boards 501 and 502 suffices. The drive in this regard occurs on the rollers arranged at the inside or rear side of the display shelf, while the remaining rollers on the display side merely serve as deflecting rollers. Alternatively, therefore, the deflecting rollers can also be swapped for other gliding elements.

FIGS. 27 and 28 show a further display shelf 600, which comprises the parts 601 and 608, which in turn independently form separate display shelves.

The parts 601 and 608 each have a frame in which are provided shelf boards 605 with corresponding conveyor belts 615, which are guided around a drive roll 602 and a deflecting roller 603. At the respective display side, stop bars 616 are provided at the shelf boards 605, again in order to prevent goods transported to the display side from falling off. Drive rolls 602 are driven by a drive belt 610, which is guided in an endless loop around the deflecting roller 604 and the drive shaft 614 of the electric motor 606.

Each part 601 and 608 has a separate drive for its shelf boards, with the drive of shelf part 608 comprising the motor 612, the drive belt 609 and the deflecting shaft 613.

As a comparison of FIGS. 27 and 28 shows, the shelf part 608 is, by way of the rollers or wheels 607 at the bottom of the frame, designed to be movable, such that the shelf part 608 can be moved in accordance with the arrows shown in FIGS. 27 and 28. This may proceed both manually and via a drive device (not shown). Through the movement of the shelf part 608, a temporary space 617 is created between the shelf parts 601 and 608, such that a replenishment aisle for loading the display shelves with goods from the rear is created. This means it is possible to load the display shelves in accordance with the first-in, first-out principle, without the need to remove all goods from the display shelf when refilling with fresh goods.

On account of the design of the drive or drives for the conveyor belts of the shelf boards with corresponding idling devices, it is possible to use a previously described shelf-stocking vehicle for automatic loading and tracking of the goods or also to manually load the display shelf independently of the tracking state of the goods.

Although the display shelf 600 in FIGS. 27 and 28 is depicted such that only one part, namely part 608, is movable, a further embodiment could provide for both parts, i.e. the shelf part 601 and 608, to be movable.

The embodiments shown illustrate advantageous realizations of the idea of the invention, without the intention to restrict it to these embodiments. Rather, in accordance with the scope of the following patent claims, a plurality of further embodiments can realize the present invention, with especially combinations of individual characteristics of the embodiments shown being conceivable.

The invention claimed is:

1. A display shelf for storage and presentation of goods for sale comprising:
   a frame;
   at least one shelf board stored within the frame such that the at least one shelf board includes a storage surface on an upper horizontally arranged side of the at least one shelf board for receiving goods for sale and at least one end face of the shelf board that includes a display side at which customers can remove goods;
   at least one conveyor belt provided above the storage surface on the upper side of the at least one shelf board for transporting the at least one conveyor belt in an endless loop via the at least one end face and an underside of the shelf board such that the conveyor belt includes surfaces which at a first side of the conveyor belt face the shelf board for facilitating gliding on the shelf board and, at a second side of the conveyor belt facing the goods for moving the goods on the second side;
   a stop bar horizontally extending along a front side of the at least one shelf board and spaced apart from the shelf board for defining a gap between the stop bar and the shelf board through which the conveyor belt is transported such that the stop bar prevents goods from falling from the front side of the at least one shelf board;
   a removable fall-off guard arranged at the display shelf at a side opposite the display side for partially blocking a shelf opening which is designed to be opened when the display shelf is refilled from the side opposite the display side such that the fall-off guard is held in place in order to avoid the goods falling off of the side opposite of the display side of the at least one shelf board;
   wherein the display shelf is designed to cooperate with a shelf-stocking vehicle such that the fall-off guard is automatically opened when the display shelf is refilled by the shelf-stocking vehicle, and
   wherein the display shelf is open at the end face of the shelf board and the end face forms the display side where customers can remove the goods for purchase from the display shelf.

2. A display shelf in accordance with claim 1, wherein the at least one shelf board comprises a plurality of shelf boards, each provided alongside each other and/or above each other in the frame, wherein one or more of said conveyor belts beside each other are assigned to each shelf board.

3. A display shelf in accordance with claim 1, wherein the display shelf is subdivided by lateral dividers into compartments.

4. A display shelf in accordance with claim 1, wherein the at least one shelf board at the one end face includes guide elements for the conveyor belt, wherein the conveyor belt is mounted such that it is configured to be driven manually by pushing the conveyor belt with a flat hand on an underside of the shelf board.

5. A display shelf in accordance with claim 1, wherein the conveyor belt is provided with a drive.

6. A display shelf in accordance with claim 5, wherein the drive drives the conveyor belt centrally.

7. A display shelf in accordance with claim 5, wherein the drive comprises rollers, which are driven centrally and/or locally for the conveyor belt.

8. A display shelf in accordance with claim 5, wherein the drive comprises rollers for driving at least one conveyor belt.

9. A display shelf in accordance with claim 5, wherein the drive comprises motors movable towards the conveyor belt to be driven and, via coupling devices can be coupled to the conveyor belt and/or to the drive assigned to them.

10. A display shelf in accordance with claim 5, wherein the drive includes a motor, which drives an endlessly circulating drive chain or a drive belt.

11. A display shelf in accordance with claim 1, wherein the conveyor belt comprises fabric, plastic, plastic fabric, or flexible fabric.

12. A display shelf in accordance with claim 5, wherein the conveyor belt has a transition mechanism for driving one or more adjacent conveyor belts.

13. A display shelf in accordance with claim 12, wherein the transition mechanism comprises wheels and continuously circulating chains or belts.

14. A display shelf in accordance with claim 12, wherein the conveyor belt is guided around two rollers arranged in parallel, with a first roller arranged at the display side of the shelf, while a second roller is arranged at the side opposite the display side, and a drive occurs at the second roller at the rear or interior side.

15. A display shelf in accordance with claim 14, wherein the transition mechanism for driving adjacent conveyor belts is provided at the second roller.

16. A display shelf in accordance with claim 1, wherein the display shelf is formed so as to be movable.

17. A display shelf in accordance with claim 16, characterized by the fact that the display shelf is formed of at least two parts, wherein each part is formed as a separate display shelf area and has a display side, and the two parts are arranged with the display sides facing away from each other and rear sides facing each other, wherein at least one of the parts is movable, such that a supply aisle can be formed between the parts along which the goods can be delivered into the shelf boards.

18. A display shelf in accordance with claim 17, wherein both or all shelf parts are formed so as to be movable.

19. A display shelf for storage and presentation of goods for sale comprising:
   a frame;
   at least one shelf board stored within the frame such that the at least one shelf board includes a storage surface on an upper horizontally arranged side of the at least one shelf board for receiving goods for sale and at least one end face of the shelf board that includes a display side at which customers can remove the goods;
   at least one conveyor belt provided above the storage surface on the upper side of the at least one shelf board for transporting the at least one conveyor belt in an endless loop via the at least one end face and an underside of the shelf board such that the conveyor belt includes surfaces which at a first side of the conveyor belt face the shelf board for facilitating gliding on the shelf board and, at a second side of the conveyor belt facing the goods for moving the goods on the second side;
   a guiding assembly comprised of a first roller arranged at the display side of the at least one shelf board and a second roller arranged at a side opposite the display side where drive occurs from a drive belt at the second roller for moving the at least one conveyer belt;
   a stop bar horizontally extending along the entire length of a front side of the at least one shelf board and spaced apart from the shelf board for defining a gap between the stop bar and the shelf board through which the conveyor belt is transported such that the stop bar prevents goods from falling from the front side of the at least one shelf board;

a pivotable fall-off guard arranged at the display shelf at the side opposite the display side for partially blocking a shelf opening which is designed to be opened when the display shelf is refilled from the side opposite the display side such that the fall-off guard is held in place in order to avoid the goods falling off of the side opposite of the display side of the at least one shelf board;

and wherein the display shelf is open at the end face of the shelf board and the end face forms the display side where customers can remove the goods for purchase from the display shelf and the display shelf is designed to cooperate with a shelf-stocking vehicle such that the fall-off guard is automatically opened when the display shelf is refilled by the shelf-stocking vehicle.

* * * * *